United States Patent
Chen et al.

(10) Patent No.: US 6,314,192 B1
(45) Date of Patent: Nov. 6, 2001

(54) SYSTEM, METHOD, AND PRODUCT FOR INFORMATION EMBEDDING USING AN ENSEMBLE OF NON-INTERSECTING EMBEDDING GENERATORS

(75) Inventors: Brian Chen, Somerville; Gregory W. Wornell, Wellesley, both of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/082,632

(22) Filed: May 21, 1998

(51) Int. Cl.$^7$ ............................................. H04K 1/00
(52) U.S. Cl. ................................................ 382/100
(58) Field of Search .................... 382/100, 232; 380/54, 210, 287, 252; 713/176; 370/527, 529

(56) References Cited

U.S. PATENT DOCUMENTS

| | | | |
|---|---|---|---|
| 5,379,131 | * | 1/1995 | Yamazaki ................................. 359/2 |
| 5,528,582 | | 6/1996 | Bodeep et al. ........................... 370/24 |
| 5,613,004 | | 3/1997 | Cooperman et al. .................... 380/28 |
| 5,636,292 | | 6/1997 | Rhoads ................................... 382/232 |
| 5,646,997 | | 7/1997 | Barton ..................................... 380/23 |
| 5,659,726 | | 8/1997 | Sandford, II et al. ................. 395/612 |
| 5,664,018 | | 9/1997 | Leighton ................................. 380/54 |

(List continued on next page.)

FOREIGN PATENT DOCUMENTS

WO 99/60514  11/1999  (WO) .............................. G06K/9/00

OTHER PUBLICATIONS

Wu et al., "Data Hiding In Images Via Multiple–Based Number Conversion And Lossy Compression," *IEEE Trans. On Consumer Electronics*, vol. 44, No. 4, Nov. 1998

(List continued on next page.)

*Primary Examiner*—Andrew W. Johns
(74) *Attorney, Agent, or Firm*—Wolf, Greenfield & Sacks, P.C.

(57) ABSTRACT

A system, method, and product are provided to (1) embed a watermark signal into a host signal, thereby generating a composite signal, (2) optionally enable the composite signal to be transmitted over a communication channel, and (3) optionally extract the watermark signal from the transmitted composite signal. In one embodiment, the invention is a method for watermarking a host signal with a watermark signal. The watermark signal is made up of watermark-signal components, each having one of two or more watermark-signal values. The host signal is made up of host-signal components, each having one of two or more host-signal values. The method includes: (1) generating two or more embedding generators, each corresponding to a single watermark-signal value of a co-processed group of one or more watermark-signal components; (2) having each embedding generator generate two or more embedding values, the total of which is referred to as an original embedding-value set such that at least one embedding value generated by one embedding generator is different than any embedding value generated by another embedding generator; and (3) setting a host-signal value of one or more selected host-signal components to an embedding value of a particular embedding generator, thereby forming a composite-signal value, such that the particular embedding generator corresponds to the watermark-signal value of the co-processed group of watermark-signal components, and such that the embedding value of the particular embedding generator is selected based on its proximity to the host-signal value.

144 Claims, 11 Drawing Sheets

U.S. PATENT DOCUMENTS

| | | |
|---|---|---|
| 5,687,236 | 11/1997 | Moskowitz et al. .................. 380/28 |
| 5,689,587 | 11/1997 | Bender et al. ...................... 382/232 |
| 5,692,205 | 11/1997 | Berry et al. ......................... 395/788 |
| 5,748,763 | 5/1998 | Rhoads ................................. 382/115 |
| 5,819,270 | 10/1998 | Malone et al. .......................... 707/7 |
| 5,828,325 | 11/1998 | Wolosewicz et al. ............... 348/473 |
| 5,843,564 * | 12/1998 | Gasper et al. ....................... 428/211 |
| 5,933,798 * | 8/1999 | Linnartz .............................. 702/191 |
| 5,940,135 | 8/1999 | Petrovic et al. ....................... 341/52 |
| 5,949,885 * | 9/1999 | Leighton ................................ 380/54 |
| 5,986,691 | 11/1999 | Henderson ............................ 348/12 |
| 6,021,196 * | 2/2000 | Sandford, II et al. ................. 380/4 |
| 6,070,163 | 5/2000 | Malone et al. .......................... 707/7 |

OTHER PUBLICATIONS

Chen et al., "An Information–Theoretic Approach To The Design Of Robust Digital Watermarking Systems," *Proc. Of IEEE ICMCS*, vol. 1, Mar. 1999, pp. 2061–2064.

Takahiko Fukinuki et al., "Extended Definition TV Fully Compatible with Existing Standards", *IEEE Transactions On Communications*, vol. COM–32, No. 8, Aug. 1984, pp. 948–953.

Walter S. Ciciora, "4.5 Mbps Data Compatibly Transmitted In 6 MHz Analog Television", presented at the 1998 NCTA Convention in Atlanta, pp. 1–8.

Mitchell D. Swanson et al., "Multimedia Data–Embedding And Watermarking Technologies", Proceedings of the IEEE, vol. 86, No. 6, Jun. 1998, pp. 1064–1087.

Brian Chen et al., "Provably Robust Digital Watermarking", *Proc. Of SPIE: Multimedia Systems and Applications II*, vol. 3845, 1999 pp. 43–54.

Brian Chen et al., "Dither Modulation: A New Approach to Digital Watermarking And Information Embedding", *Proc. Of SPIE: Security and Watermarking of Multimedia Contents*, vol. 3657, 1999, pp. 342–353.

F.A.P. Petitcolas et al., "Information Hiding—A Survey", Proceedings of the IEEE, vol. 87, No. 7, Jul. 1999, pp. 1062–1078.

F. Hartung et al., "Multimedia Watermarking Techniques", Proceedings of the IEEE, vol. 87, No. 7, Jul. 1999, pp. 1079–1107.

EnCamera Sciences Corporation, Executive Summary, 1998, pp. 1–15.

Mitchell D. Swanson et al., "Data Hiding For Video–In–Video", *ICIP–97*, vol. 2, 1997, pp. 676–679.

Before the Federal Communications Commission, Washington, DC, In the matter of Digital Data Transmission Within The Video Portion Of Television Broadcast Station Transmissions, MM Docket No. 95–42, RM–7567, Report And Order, Jun. 28, 1996, pp. 1–9.

Before the Federal Communications Commission, Washington, DC, In the Matter of Digital Data Transmission Within The Video Portion Of Television RM–7567 Broadcast Station Transmissions, MM Docket No. 95–42, Notice Of Proposed Rule Making, May 3, 1995, pp. 1–12.

Gerzon et al., "A High–Rate Buried Data Channel for Audio CD," An Audio Engineering Society Preprint 3551 (D3–1), 94th Convention Mar. 16–19, 1993, Berlin, pp. 1–28, figs. 2, 4, 6, 8, 10, 12, & 14.

Oomen et al., "A Variable–Bit–Rate Buried–Data Channel for Compact Disc," Philips Research Laboratories, The Netherlands, pp. 1–11.

Kundur et al., "Digital Watermarking Using Multiresolution Wavelet Decomposition," No. 0–7803–4428–6, May 12–15, 1998, Seattle, Washington, IEEE, pp. 2969–2972.

Zamir et al., "On Lattice Quantization Noise," IEEE Transationcs on Information Theory, vol. 42, No. Jul. 1996, pp. 1152–1159.

Marcellini et al., "Trellis Coded Quantization of Memoryless and Gauss–Markoy Sources," IEEE Transactions on Communications, vol. 38, No. 1, Jan. 1990, pp. 82–93.

Jayant et al., "Digital Coding of Waveforms," Prentice Hall, 1984, pp. 164–175.

Cox et al., "A secure, robust watermark for multimedia," in Information Hiding, First International Workshop Proceedings, pp. 185–206, Jun. 1996.

Smith et al., "Modulation and information hiding in images, "in Information Hiding, First International Workshop Proceedings, pp. 207–225 Jun. 1996.

Bender et al., "Techniques for Data Hiding," IBM Systems Journal, vol. 35, Nos. 3&4, 1996, pp. 313–336.

Boney et al., "Digital Watermarks for Audio Signals," Proc. IEEE Multimedia '96, 1996, pp. 473–480.

Delaigle et al., "Digital Watermarking," SPIE vol. 2659, 1996, pp. 99–110.

Davern et al. "Fractal based image steganography," in Information Hiding, First International Workshop Proceedings, pp. 279–294, Jun. 1996.

Anderson, "Stretching the Limits of Steganography,"in Information Hiding, First International Workshop Proceedings, pp. 39–48.

Pfitzmann, "Information hiding terminology," in Information Hiding, First International Workshop Proceedings, pp. 347–350, Jun. 1996.

Braudaway, "Protecting Publicly Available Images with a Visible Image Watermark," SPIE vol. 2659, pp. 126–133, Feb. 1996.

Tanaka et al, "Embedding Secret Information into a Dithered Multi–level Image," Proc. IEEE MilitaryConference Communications Conference. pp 216–220, 1990.

Hernandez, et al. "Performance Analysis of a 2–D–Multipulse Amplitude Modulation Scheme for Data Hiding Hiding and Watermarking of Still Images," IEEE Journal on Selected Areas In Communications, vol. 16 No. 14, pp 510–524 May 1998.

Alliro Product Information; at least as early as Jan. 8, 1998.

* cited by examiner

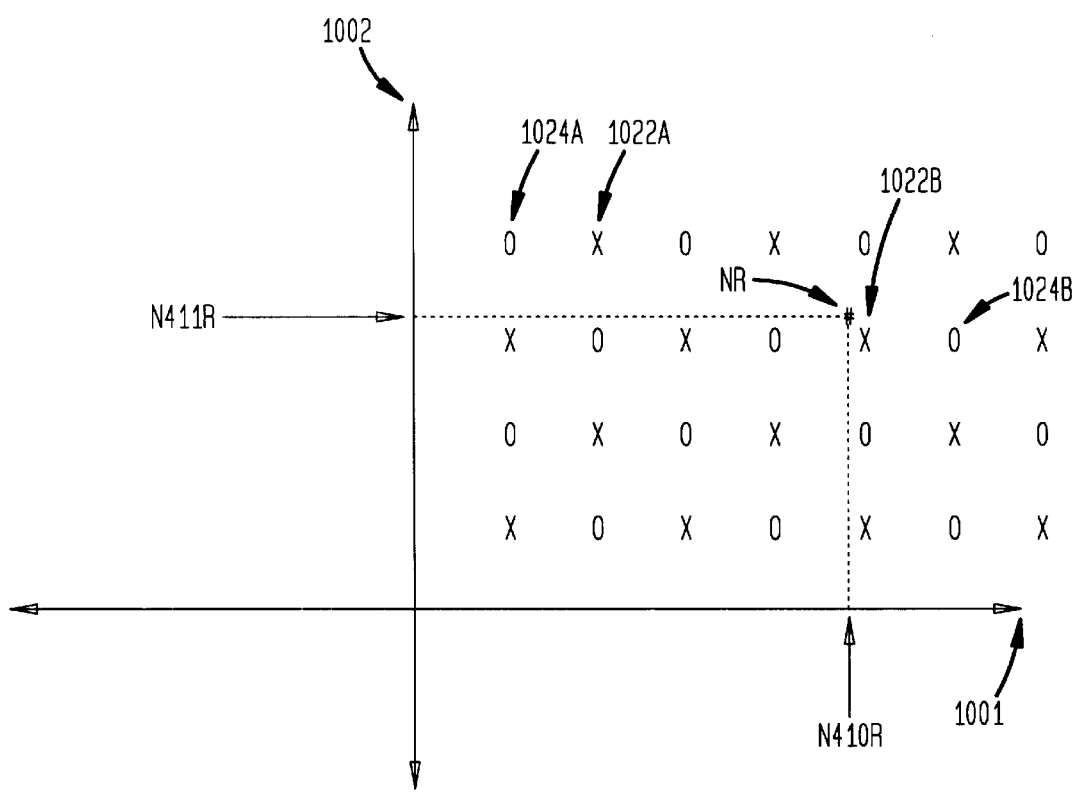

US 6,314,192 B1

SYSTEM, METHOD, AND PRODUCT FOR INFORMATION EMBEDDING USING AN ENSEMBLE OF NON-INTERSECTING EMBEDDING GENERATORS

BACKGROUND OF THE INVENTION

1. Field of the Invention

The invention generally relates to systems, methods, and products for watermarking of signals, and, more particularly, to computer-implemented systems, methods, and products for embedding an electronic form of a watermarking signal into an electronic form of a host signal.

2. Related Art

There is growing commercial interest in the watermarking of signals, a field more generally referred to as "steganography." Other terms that refer to this field include "hidden communication," "information hiding," "data hiding," and "digital watermarking." Much of this interest has involved deterrence of copyright infringement with respect to electronically distributed material. Generally, the purpose of known steganographic systems in this field is to embed a digital watermark signal (for example, a serial number) in a host signal (for example, a particular copy of a software product sold to a customer). Other common host signals include audio, speech, image, and video signals. A purpose of many of such digital watermarking systems is to embed the watermark signal so that it is difficult to detect, and so that it is difficult to remove without corrupting the host signal. Other purposes are to provide authentication of signals, or to detect tampering.

Often, such known systems include "coding" functions that embed the watermark signal into the host signal to generate a composite signal, and "decoding" functions that seek to extract the watermark signal from the composite signal. Such functions may also be referred to as transmitting and receiving functions, indicating that the composite signal is transmitted over a channel to the receiver. Generally, the composite signal is suitable for the functions intended with respect to the host signal. That is, the host signal has not been so corrupted by the embedding as to unduly compromise its functions, or a suitable reconstructed host signal may be derived from the composite signal.

Although prevention of copyright infringement has driven much of the current interest in steganographic systems, other applications have also been proposed. For example, digital watermarking could be used by sponsors to automate monitoring of broadcasters' compliance with advertising contracts. In this application, each commercial is watermarked, and automated detection of the watermark is used to determine the number of times and time of day that the broadcaster played the commercial. In another application, captions and extra information about the host signal could be embedded, allowing those with the appropriate receivers to recover the information.

Various known approaches to the implementation of steganographic systems and simple quantization techniques are described in the following publications, which are hereby incorporated by reference: (1) N. S. Jayant and P. Noll, Digital Coding of Waveforms : *Principles and Applications to Speech and Video*. Prentice-Hall, 1984; (2) I. J. Cox, J. Killian, T. Leighton, and T. Shamoon, "A secure, robust watermark for multimedia," in *Information Hiding. First International Workshop Proceedings*, pp.185–206, June 1996; (3) J. R. Smith and B. O. Comiskey, "Modulation and information hiding in images," in *Information Hiding. First International Workshop Proceedings*, pp.207–226, June 1996; (4) W. Bender, D. Gruhl, N. Morimoto, and A. Lu, "Techniques for data hiding," *IBM Systems Journal*, vol.35, no.3–4, pp.313–336, 1996; (5) L. Boney, A. H. Tewfik, and K. N. Hamdy, "Digital watermarks for audio signals," in *Proceedings of the International Conference on Multimedia Computing and Systems* 1996, pp.473–480, June 1996; (6) J.-F. Delaigle, C. D. Vleeschouwer, and B. Macq, "Digital watermarking," in *Proceedings of SPIE, the International Society for Optical Engineering*, pp.99–110, Feb. 1996; (7) P. Davern and M. Scott, "Fractal based image steganography," in *Information Hiding. First International Workshop Proceedings*, pp.279–294, June 1996; (8) R. Anderson, "Stretching the limits of steganography," in *Information Hiding. First International Workshop Proceedings*, pp.39–48, June 1996; (9) B. Pfitzmann, "Information hiding terminology," in *Information Hiding. First International Workshop Proceedings*, pp.347–350, June 1996; and (10) G. W. Braudaway, K. A. Magerlein, and F. Mintzer, "Protecting publicly-available images with a visible image watermark," in *Proceedings of SPIE, the International Society for Optical Engineering*, pp.126–133, Feb. 1996.

Some of such known approaches may be classified as "additive" in nature (see, for example, the publications labeled 2–6, above). That is, the watermark signal is added to the host signal to create a composite signal. In many applications in which additive approaches are used, the host signal is not known at the receiving site. Thus, the host signal is additive noise from the viewpoint of the decoder that is attempting to extract the watermark signal.

Some of such, and other, known approaches (see, for example, the publications labeled 2, 4, 5, 6, and 7, above) exploit special properties of the human visual or auditory systems in order to reduce the additive noise introduced by the host signal or to achieve other objectives. For example, it has been suggested that, in the context of visual host signals, the watermark signal be placed in a visually significant portion of the host signal so that the watermark signal is not easily removed without corrupting the host signal. Visually significant portions are identified by reference to the particularly sensitivity of the human visual system to certain spatial frequencies and characteristics, including line and comer features. (See the publication labeled 2, above.) It is evident that such approaches generally are limited to applications involving the particular human visual or auditory characteristics that are exploited.

One simple quantization technique for watermarking, commonly referred to as "low-bit coding" or "low-bit modulation," is described in the publication labeled 4, above. As described therein, the least significant bit, or bits, of a quantized version of the host signal are modified to equal the bit representation of the watermark signal that is to be embedded.

SUMMARY OF THE INVENTION

The present invention includes in one embodiment a system, method, and product for (1) embedding a watermark signal into a host signal, thereby generating a composite signal, (2) optionally enabling the composite signal to be transmitted over a communication channel, and (3) optionally extracting the watermark signal from the transmitted composite signal.

In one embodiment, the invention is a method for watermarking a host signal with a watermark signal. The watermark signal is made up of watermark-signal components, each having one of two or more watermark-signal values. The host signal is made up of host-signal components, each having one of two or more host-signal values. The method includes: (1) generating two or more embedding generators, each corresponding to a single watermark-signal value of a co-processed group of one or more watermark-signal components; (2) having each embedding generator generate two or more embedding values, the total of which is referred to as an original embedding-value set such that at least one embedding value generated by one embedding generator is different than any embedding value generated by another embedding generator; and (3) setting a host-signal value of one or more selected host-signal components to an embedding value of a particular embedding generator, thereby forming a composite-signal value, such that the particular embedding generator corresponds to the watermark-signal value of the co-processed group of watermark-signal components, and such that the embedding value of the particular embedding generator is selected based on its proximity to the host-signal value.

In one embodiment, the embedding value of the particular embedding generator is an embedding value that is the closest of all embedding values of that embedding generator in distance to the host-signal value. The distance may be determined by a Euclidean measure, a weighted Euclidean measure, or by a non-Euclidean measure.

In one implementation, the first step includes the steps of (a) determining a maximum allowable watermark-induced distortion level; (b) determining an expected channel-induced distortion level; and (c) designating the two or more embedding generators based on the maximum allowable watermark-induced distortion level and the expected channel-induced distortion level.

The second step, in some implementations, is based on a pre-determined relationship between each of the embedding values generated by the particular embedding generator. Also, the second step may further be based on a pre-determined relationship between an embedding value generated by the particular embedding generator and an embedding value generated by another embedding generator that, in some implementations, may be a dithered relationship. Further, the dithered relationship may be between quantized embedding values, or analog embedding values. In alternative implementations, the second step may be based on a predetermined list including at least one embedding value generated by the particular embedding generator.

In some embodiments, the method may also include a fourth step of extracting the first watermark-signal value from the composite-signal value to form a reconstructed watermark-signal value. In some implementations, this fourth step may include the steps of (a) acquiring the composite-signal value, which may include channel noise; (b) replicating the original embedding-value set to form a replicated embedding-value set such that each embedding value of the replicated embedding-value set has the same correspondence to a single watermark-signal value as has the embedding value of the original embedding-value set from which it is replicated; (c) selecting an embedding value of the replicated embedding-value set based on its proximity to the composite-signal value; and (d) setting the reconstructed watermark-signal value to the watermark-signal values to which the selected embedding value corresponds.

In some implementations, the selected embedding value is an embedding value that is the closest of all embedding values of the replicated embedding-value set in distance to the composite-signal value. Such distance may be determined by a Euclidean, weighted-Euclidean, or non-Euclidean measure.

In one embodiment, the invention is a method for extracting from a composite-signal value, which may include noise, a watermark-signal value of a co-processed group of watermark-signal components in order to form, or set, a reconstructed watermark-signal value. This method operates upon a composite-signal value that had been formed by an information embedder by setting a host-signal value to an embedding value of a particular embedding generator that corresponded to the watermark-signal value. The embedding value had been selected based on its proximity to the host-signal value. Also, the embedding value had been one of the original embedding-value set generated by two or more embedding generators, each of which had generated two or more embedding values, such that at least one embedding value generated by one embedding generator had not been the same as any embedding value generated by another embedding generator. The extracting method includes: (a) acquiring the composite-signal value; (b) replicating the original embedding-value set to form a replicated embedding-value set, each embedding value of the second embedding-value set having the same correspondence to a single watermark-signal value as has the one embedding value of the first embedding-value set from which it is replicated; (c) selecting an embedding value of the replicated embedding-value set based on its proximity to the composite-signal value; and (d) setting the reconstructed watermark-signal value to the watermark-signal value to which the embedding value of the replicated embedding-value set corresponds. In one implementation, the embedding value of the replicated embedding-value set is an embedding value that is the closest of all embedding values of the replicated embedding-value set in distance to the composite-signal value.

In one embodiment, the invention is a system that watermarks a host signal with a watermark signal. The watermark signal is made up of watermark-signal components, each having one of two or more watermark-signal values. The host signal is made up of host-signal components, each having one of two or more host-signal values. The system includes: (1) an ensemble generator that generates two or more embedding generators, each corresponding to a single watermark-signal value of a co-processed group of one or more watermark-signal components; (2) an embedding value generator that provides that each embedding generator generate two or more embedding values, the total of which is referred to as an original embedding-value set such that at least one embedding value generated by one embedding generator is different than any embedding value generated by another embedding generator; and (3) a point coder that sets a host-signal value of one or more selected host-signal components to an embedding value of a particular embedding generator, thereby forming a composite-signal value, such that the particular embedding generator corresponds to the watermark-signal value of the co-processed group of watermark-signal components, and such that the embedding value of the particular embedding generator is selected based on its proximity to the host-signal value.

In one embodiment, the embedding value of the particular embedding generator is an embedding value that is the closest of all embedding values of that embedding generator in distance to the host-signal value. The distance may be determined by a Euclidean measure, a weighted Euclidean measure, or by a non-Euclidean measure.

In one embodiment, the invention is an information extractor that extracts from a composite-signal value, which may include noise, a watermark-signal value of a co-processed group of watermark-signal components in order to form, or set, a reconstructed watermark-signal value. The extractor operates upon a composite-signal value that had been formed by an information embedder by setting a host-signal value to an embedding value of a particular embedding generator that corresponded to the watermark-signal value. The embedding value had been selected based on its proximity to the host-signal value. Also, the embedding value had been one of the original embedding-value set generated by two or more embedding generators, each of which had generated two or more embedding values, such that at least one embedding value generated by one embedding generator had not been the same as any embedding value generated by another embedding generator.

The extractor includes: a synchronizer that acquires the composite-signal value; an ensemble replicator that replicates the original embedding-value set to form a replicated embedding-value set, each embedding value of the second embedding-value set having the same correspondence to a single watermark-signal value as has the one embedding value of the first embedding-value set from which it is replicated; and a point decoder that selects an embedding value of the replicated embedding-value set based on its proximity to the composite-signal value; and sets the reconstructed watermark-signal value to the watermark-signal value to which the embedding value of the replicated embedding-value set corresponds. In one implementation, the embedding value of the replicated embedding-value set is an embedding value that is the closest of all embedding values of the replicated embedding-value set in distance to the composite-signal value.

BRIEF DESCRIPTION OF THE DRAWINGS

The above and further advantages of the invention will be more clearly appreciated from the following detailed description when taken in conjunction with the accompanying drawings, in which like reference numerals indicate like structures or method steps, in which the leftmost one or two digits of a reference numeral indicate the number of the figure in which the referenced element first appears (for example, the element 456 appears first in FIG. 4, the element 1002 first appears in FIG. 10), solid lines generally indicate control flow, dotted lines generally indicate data flow, and such that:

FIG. 10 is a graphical representation of one illustrative example of two-dimensional extracting of an exemplary watermark signal from an exemplary host signal in accordance with the operations of one embodiment of a point decoder of the information extractor of FIG. 9.

DETAILED DESCRIPTION

Figure 1:
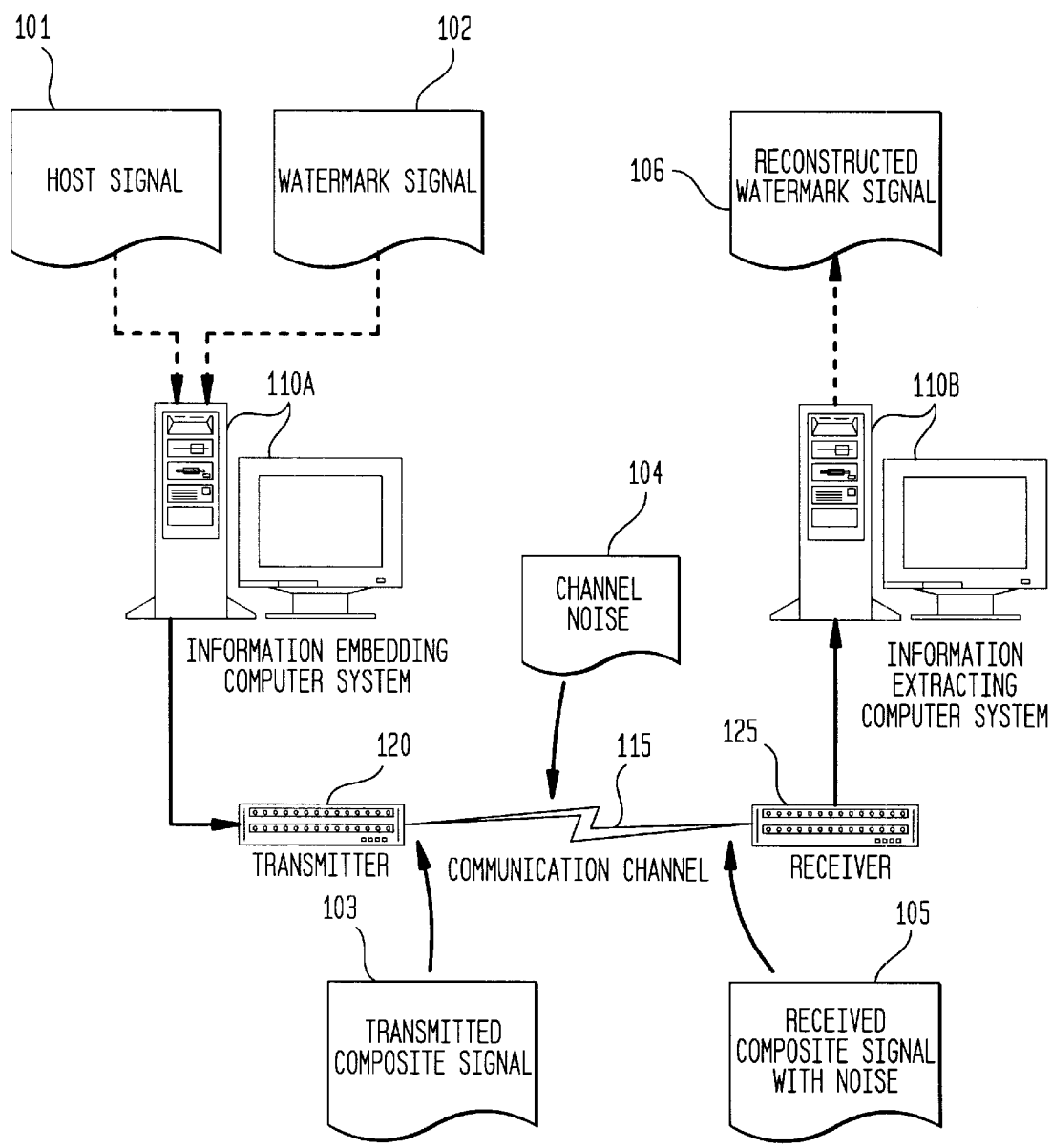
FIG. 1 is a simplified block diagram of one embodiment of a first computer system that cooperates with one embodiment of an information embedder of the present invention, one embodiment of a second computer system that cooperates with one embodiment of an information extractor of the present invention, and a communication channel coupling the two computer systems.

The attributes of the present invention and its underlying method and architecture will now be described in greater detail in reference to one embodiment of the invention, referred to as information embedder and extractor 200. Embedder-extractor 200 embeds watermark signal 102 into host signal 101 to generate composite signal 103, optionally enables composite signal 103 to be transmitted over communication channel 115 that may include channel noise 104, and optionally extracts reconstructed watermark signal 106 from the transmitted composite signal.

Following is a glossary of terms used with a particular meaning in describing the functions, elements, and processes of embedder-extractor 200. Some of such terms are defined at greater length below. This glossary is not necessarily exhaustive; i.e., other terms may be explicitly or implicitly defined below.

"Communication channel" means any medium, method, or other technique for transferring information, including transferring information to another medium or using a storage device or otherwise. The term "communication channel" thus is more broadly applied in this description of the present invention than may typically be used in other contexts. For example, "communication channel" as used herein may include electromagnetic, optical, or acoustic transmission mediums; manual or mechanical delivery of a floppy disk or other memory storage device; providing a signal to, or obtaining a signal from, a memory storage device directly or over a network; and using processes such as printing, scanning, recording, or regeneration to provide, store, or obtain a signal. Signal processing may take place in the communication channel. That is, a signal that is "transmitted" from an embedding computer system may be processed in accordance with any of a variety of known signal processing techniques before it is "received" by an extracting computer system. The term "transmitted" is used broadly herein to refer to any technique for providing a composite signal and the term "received" is used broadly herein to refer to any technique for obtaining the transmitted composite signal.

"Composite signal" is a signal including a host signal, and a watermark signal embedded in the host signal.

"Co-processed group of components of a watermark signal" means components of a watermark signal that are together embedded in one or more host signal components, such host signal components being used to embed such co-processed group of components, and no other components of the watermark signal. For example, a watermark signal may consist of four bits, the first two of which are together embedded (co-processed) in any number of pixels of a host signal image, and the remaining two of which are together embedded (co-processed) in any number of pixels of the host signal image.

"Dithered quantization value" means a value generated by a dithered quantizer. A dithered quantization value may be a scalar, or a vector, value.

"Dithered quantizer" means a type of embedding generator that generates one or more non-intersecting, uniquely mapped, dithered quantization values. Further, each of the dithered quantization values generated by any one of an ensemble of two or more dithered quantizers differs by an offset value (i.e., are shifted) from corresponding dithered quantization values generated by each other dithered quantizer of the ensemble.

"Ensemble of embedding generators" means two or more embedding generators, each corresponding to one, and only one, of the potential watermark-signal values of a co-processed group of components of a watermark signal.

"Embedding generator" means a list, description, table, formula, function, or other generator or descriptor that generates or describes embedding values. One illustrative example of an embedding generator is a dithered quantizer.

"Embedding value" means a value generated, described, or otherwise specified or indicated (hereafter, simply "generated") by an embedding generator. Each embedding generator generates at least two embedding values, such that no one of such embedding values is the same as any other embedding value generated by any embedding generator of the ensemble. An embedding value may be a scalar, or a vector, value.

"Host signal" means a signal into which a watermark signal is to be embedded. In one illustrative example, a host signal is a black-and-white image having 256×256 (=65,536) pixels, each pixel having a grey scale value.

"Host-signal component" means a digital, digitized, or analog elemental component of the host signal. For example, referring to the illustrative example provided with respect to the definition of "host signal," one host-signal component is one of the 65,536 pixels of the host signal picture.

"Host-signal value" means a value of one host-signal component; for example, the grey-scale value of one of the 65,536 pixels of the illustrative host signal picture. The host-signal value may be a scalar, or a vector, value. With respect to a vector value, the host-signal value may be, for example, a vector having a length that represents the RGB (red-green-blue) value of one or more pixels of an image. Other types of values of host-signal components include color; measures of intensity other than the illustrative grey-scale; texture; amplitude; phase; frequency; real numbers; integers; imaginary numbers; text-character code; parameters in a linear or non-linear representation of the host signal, and so on.

"Noise" means distortions or degradations that may be introduced into a signal, whatever the source or nature of the noise. Some illustrative sources of noise include processing techniques such as lossy compression (e g., reducing the number of bits used to digitally represent information), re-sampling, under-sampling, over-sampling, format changing, imperfect copying, re-scanning, re-recording, or additive combinations of signals; channel noise due to imperfections in the communication channel such as transmission loss or distortion, geometric distortion, warping, interference, or extraneous signals entering the channel; and intentional or accidental activities to detect, remove, change, disrupt, or in any way affect the signal. The term "noise" thus is more broadly applied in this description of the present invention than may typically be used in other contexts.

"Non-intersecting embedding generator ensemble" means an ensemble of embedding generators that generate non-intersecting embedding values. One embodiment of a non-intersecting embedding generator ensemble is an ensemble of non-intersecting dithered quantizers.

"Non-intersecting embedding values" means that no two or more embedding values generated by any of an ensemble of embedding generators are the same. One embodiment of non-intersecting embedding values are non-intersecting dithered quantization values generated by dithered quantizers.

"Signal" means analog and/or digital information in any form whatsoever, including, as non-limiting examples: motion or still film; motion or still video; print media; text and extended text characters; projection media; graphics; audio; sonar; radar; x-ray; MRI and other medical images; database; data; identification number, value, and/or sequence; and a coded version of any of the preceding.

"Transmit" means to enable a signal (typically, a composite signal) to be transferred from an information embedding system to an information extracting system over a communication channel.

"Uniquely mapped dithered quantization value" is one example of a uniquely mapped embedding value that is generated by an embedding generator that is a dithered quantizer.

"Uniquely mapped embedding value" means that each embedding generator corresponds to one, and only one, watermark-signal value of any of a co-processed group of components of a watermark signal, and that no one of the embedding values generated by such embedding generators is the same as any other embedding value generated by such embedding generators.

"Watermark signal" means a signal to be embedded in a host signal. For example, an 8-bit identification number may be a watermark signal to be embedded in a host signal, such as the illustrative 256×256 pixel picture. As indicated by the definition of "signal" above, it will be understood that a watermark signal need not be an identification number or mark, but may be any type of signal whatsoever. Thus, the term "watermark" is used more broadly herein than in some other applications, in which "watermark" refers generally to identification marks. Also, a watermark signal need not be a binary, or other digital, signal. It may be an analog signal, or a mixed digital-analog signal. A watermark signal also may have been subject to error-correction, compression, transformation, or other signal processing. The watermark signal may also be determined, in whole or in part, based on the host signal. Such dependence may occur, for example, in an application in which watermarking provides authentication of a signal, as when a digital signature is derived from the host signal and embedded therein, and the extracted digital signature is compared to a signature that is similarly derived from the host signal.

"Watermark-signal component" means a digital, digitized, or analog elemental component of the watermark signal. For example, in the illustrative example in which the watermark signal is an 8-bit identification number, one watermark-signal component is one bit of the 8-bits.

"Watermark-signal value" means one of a set of two or more potential values of a watermark-signal component or of a co-processed group of watermark-signal components. That is, such value may be a scalar or a vector value. For example, watermark-signal values include either the value "0" or "1" of the illustrative one bit of the 8-bit watermark identification signal, or the values "00," "01," "10," or "11" of a co-processed two bits of such signal. With respect to a vector value, the watermark-signal value may be, for example, a vector having a length that represents the RGB value of one or more components of the watermark signal. Other types of values of watermark-signal components include color; intensity; texture; amplitude; phase; frequency; real numbers; other integers; imaginary numbers; text-character code; parameters of a linear or non-linear representation of the watermark signal; and so on. Although a watermark-signal component has two or more potential watermark-signal values, it will be understood that the value of such component need not vary in a particular application. For example, the first bit of the illustrative 8-bit watermark identification signal may generally, or invariably, be set to "0" in a particular application.

Embedder-extractor 200 includes information embedder 201 and information extractor 202. Information embedder 201 generates an ensemble of embedding generators that produce embedding values, each such embedding generator corresponding to a possible value of a co-processed group of components of a watermark signal. In the illustrated embodiment, the embedding generators are dithered quantizers, and the embedding values thus are dithered quantization values. Information embedder 201 also changes selected values of the host signal to certain dithered quantization values that are closest to the host-signal values, thereby generating a composite signal. Such dithered quantization values are those generated by the particular dithered quantizer of the ensemble of dithered quantizers that corresponds to the value of the portion of the watermark signal that is to be embedded. The composite signal may be provided to a transmitter for transmission over a communication channel.

Information extractor 202 receives the received composite signal with channel noise and other noise, if any. Information extractor 202 synchronizes such composite signal so that the location of particular portions of such signal may be determined. Information extractor 202 also replicates the ensemble of embedding generators and embedding values that information embedder 201 generated. Such replication may be accomplished in one embodiment by examining a portion of the received signal. In alternative embodiments, the information contained in the quantizer specifier may be available a priori to information extractor 202. The replicated embedding generators of the illustrated embodiment are dithered quantizers, and the embedding values are dithered quantization values. Further, for each co-processed group of components of the watermark signal, information extractor 202 determines the closest dithered quantization value to received values of selected components of the host signal, thereby reconstructing the watermark signal.

Embedder-extractor 200 is an illustrative embodiment that is implemented on two computer systems linked by the transmitter, communication channel, and receiver. One computer system is used with respect to embedding the watermark, and the other is used with respect to extracting the watermark. In the illustrated embodiment, embedder-extractor may be implemented in software, firmware, and/or hardware. It will be understood, however, that many other embodiments are also possible. For example, both the embedding and extracting functions may be performed on the same computer system; or either or both of such functions may be implemented in hardware without the use of a computer system. It will also be understood that the embedding function may be performed in some embodiments, but not the extracting function, or vice versa. A communication channel may not be material in some embodiments.

In this detailed description, references are made to various functional modules of embedder-extractor 200 that, as noted, may be implemented on computer systems either in software, hardware, firmware, or any combination thereof. For convenience of illustration, such functional modules generally are described in terms of software implementations. Such references therefore will be understood typically to comprise sets of software instructions that cause described functions to be performed. Similarly, in software implementations, embedder-extractor 200 as a whole may be referred to as "a set of embedder-extractor instructions."

It will be understood by those skilled in the relevant art that the functions ascribed to embedder-extractor 200 of the illustrated software implementation, or any of its functional modules, whether implemented in software, hardware, firmware, or any combination thereof, typically are performed by a processor such as a special-purpose microprocessor or digital signal processor, or by the central processing unit (CPU) of a computer system. Henceforth, the fact of such cooperation between any of such processor and the modules of the invention, whether implemented in software, hardware, firmware, or any combination thereof, may therefore not be repeated or further described, but will be understood to be implied. Moreover, the cooperative functions of an operating system, if one is present, may be omitted for clarity as they are well known to those skilled in the relevant art.

Computer Systems 110

FIG. 1 is a simplified block diagram of an illustrative embodiment of two computer systems 110A and 110B (generally and collectively referred to as computer systems 110) with respect to which an illustrative embodiment of embedder-extractor 200 is implemented. In the illustrated embodiment, information embedder 201 is implemented using computer system 110A (such computer system thus referred to for convenience as an embedding computer system), and information extractor 202 is implemented using computer system 110B (referred to for convenience as an extracting computer system). In an alternative embodiment, either or both of information embedder 201 and information extractor 202 may be implemented in a special-purpose microprocessor, a digital-signal processor, or other type or processor. In the illustrated embodiment, embedding computer system 110A is coupled to transmitter 120, which transmits a signal over communication channel 115 for reception by receiver 125. Extracting computer system 110B is coupled to receiver 125. Computer systems 110 thus are coupled by transmitter 120, communication channel 115, and receiver 125. In alternative embodiments, transmitter 120 and a communication channel may couple embedding computer system 110A to many extracting computer systems. For example, such communication channel may be a network, or a portion of the electromagnetic spectrum used for television transmissions, and any number of computer systems may be coupled to the channel either for transmission, reception, or both.

As noted, the term "communication channel" is used broadly herein, and may include the providing or obtaining of information to or from a floppy disk, a graphical image on paper or in electronic form, any other storage device or medium, and so on. As also noted, the providing or obtaining of information to or from the communication may include various known forms of signal processing.

Figure 2A:
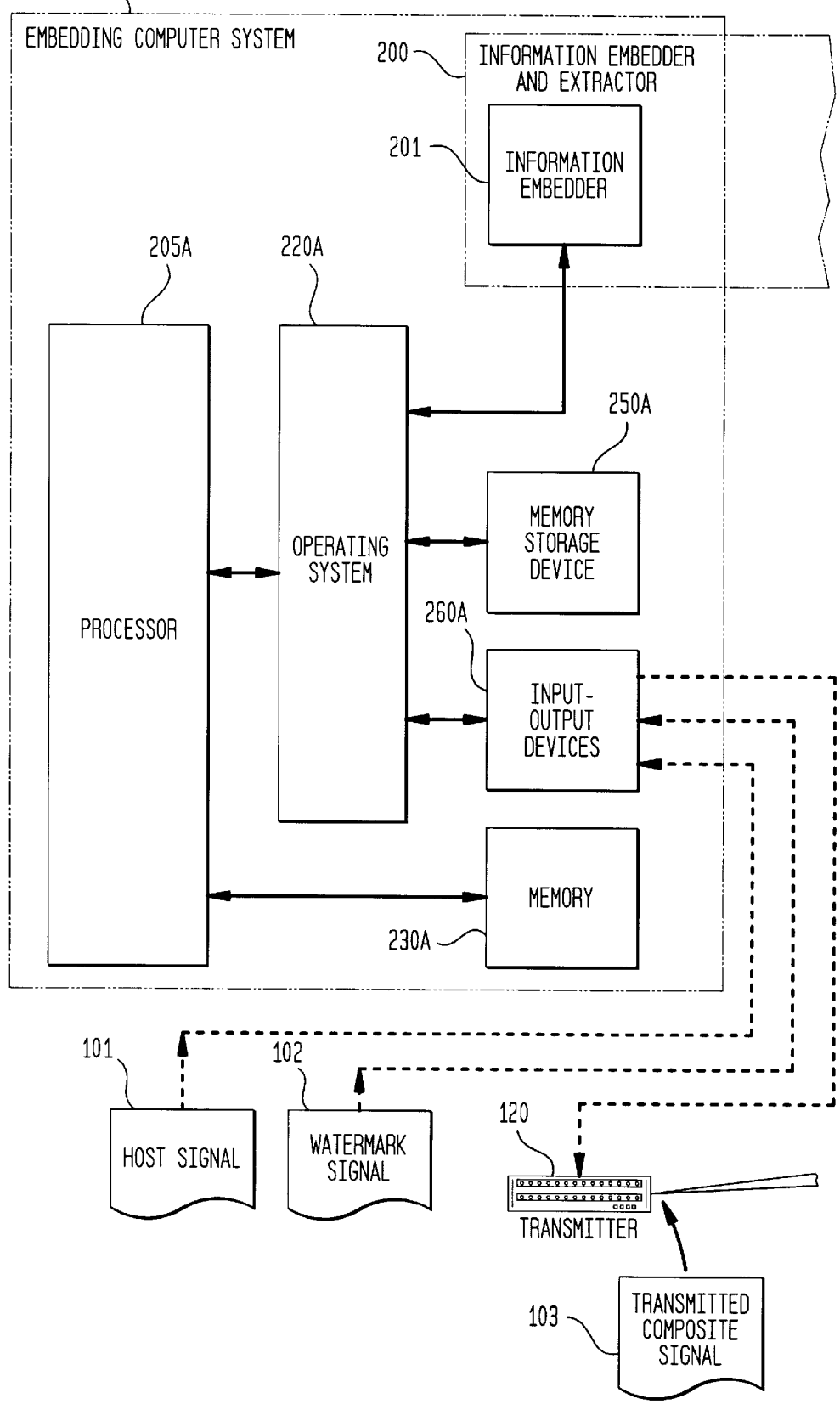
FIG. 2 is a functional block diagram of one embodiment of the first and second computer systems of FIG. 1, including one embodiment of the information embedder and information extractor of the present invention.
Figure 2B:
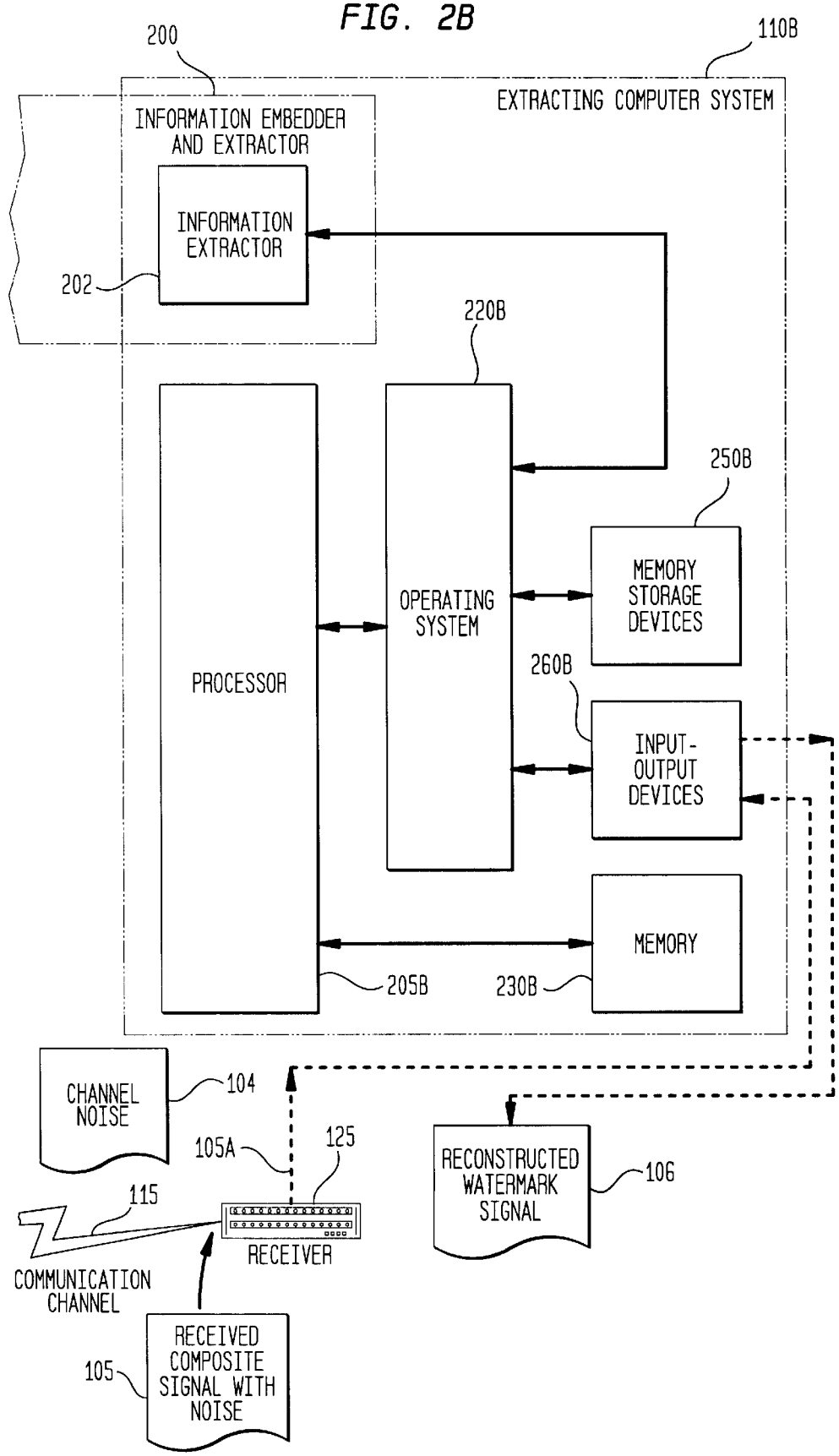

It is assumed for illustrative purposes that noise of any type, symbolically represented as channel noise 104, is introduced into channel 115 of the illustrated embodiment. It will be understood that channel noise 104, or aspects of it, may also be introduced by processing functions (not shown) implemented in, or that act in cooperation with, one or both of computer systems 110A and 110B. FIG. 2 is a simplified functional block diagram of an illustrative embodiment of computer systems 110, including embedder-extractor 200.

Each of computer systems 110 may include a personal computer, network server, workstation, or other computer platform now or later developed. Computer systems 110 may also, or alternatively, include devices specially designed and configured to support and execute the functions of embedder-extractor 200, and thus need not be general-purpose computers. Each of computer system 110A and computer system 110B may include known components such as, respectively, processors 205A and 205B, operating systems 220A and 220B, memories 230A and 230B, memory storage devices 250A and 250B, and input-output devices 260A and 260B. Such components are generally and collectively referred to as processors 205, operating systems 220, memories 230, memory storage devices 250, and input-output devices 260. It will be understood by those skilled in the relevant art that there are many possible configurations of the components of computer systems 110 and that some components that may typically be included in computer systems 110 are not shown, such as a video card, data backup unit, signal-processing card or unit, parallel processors, co-processors, and many other devices.

It will also be understood by those skilled in the relevant arts that other known devices or modules typically used with respect to transmitting or receiving signals may be included in computer systems 110, but are not shown in the illustrated embodiment. Alternatively, or in addition, some of such known devices may be separate hardware units coupled with computer systems 110, schematically represented in some of the figures as transmitter 120 and receiver 125. For example, such devices or modules may include a modulator and/or demodulator; switches; multiplexers; a transmitter of electromagnetic, optical, acoustic, or other signals; or a receiver of such signals. Such transmitting or receiving devices may employ analog, digital, or mixed-signal processing of any type, including encoding/decoding, error detection/correction, encryption/decryption, other processing, or any combination thereof Such devices may employ any of a variety of known modulation and other techniques or processes, such as amplitude modulation; frequency modulation; uncoded pulse-amplitude modulation (PAM), quadrature-amplitude modulation (QAM), or phase-shift keying (PSK); coded PAM, QAM, or PSK employing block codes or convolutional codes; any combination of the preceding; or a technique or process to be developed in the future.

Processors 205 may be commercially available processors such as a Pentium processor made by Intel, a PA-RISC processor made by Hewlett-Packard Company, a SPARC® processor made by Sun Microsystems, a 68000 series microprocessor made by Motorola, an Alpha processor made by Digital Equipment Corporation, or they may be one of other processors that are or will become available. In other embodiments, a digital signal processor, such as a TMS320-series processor from Texas Instruments, a SHARC processor from Analog Devices, or a Trimedia processor from Phillips, may be used.

Processors 205 execute operating systems 220, which may be, for example, one of the DOS, Windows 3.1, Windows for Work Groups, Windows 95, Windows NT, or Windows 98 operating systems from the Microsoft Corporation; the System 7 or System 8 operating system from Apple Computer; the Solaris operating system from Sun Microsystems; a Unix®-type operating system available from many vendors such as Sun Microsystems, Inc., Hewlett-Packard, or AT&T; the freeware version of Unix® known as Linux; the NetWare operating system available from Novell, Inc.; another or a future operating system; or some combination thereof. Operating systems 220 interface with firmware and hardware in a well-known manner, and facilitate processors 205 in coordinating and executing the functions of the other components of computer systems 110. As noted, in alternative embodiments, either or both of operating system 220 need not be present. Either or both of computer systems 110 may also be one of a variety of known computer systems that employ multiple processors, or may be such a computer system to be developed in the future.

Memories 230 may be any of a variety of known memory storage devices or future memory devices, including, for example, any commonly available random access memory (RAM), magnetic medium such as a resident hard disk, or other memory storage device. Memory storage devices 250 may be any of a variety of known or future devices, including a compact disk drive, a tape drive, a removable hard disk drive, or a diskette drive. Such types of memory storage devices 250 typically read from, and/or write to, a program storage device (not shown) such as, respectively, a compact disk, magnetic tape, removable hard disk, or floppy diskette. Any such program storage device may be a computer program product. As will be appreciated, such program storage devices typically include a computer usable storage medium having stored therein a computer software program and/or data.

Computer software programs, also called computer control logic, typically are stored in memories 230 and/or the program storage devices used in conjunction with memory storage devices 250. Such computer software programs, when executed by processors 205, enable computer systems 110 to perform the functions of the present invention as described herein. Accordingly, such computer software programs may be referred to as controllers of computer systems 110.

In one embodiment, the present invention is directed to a computer program product comprising a computer usable medium having control logic (computer software program, including program code) stored therein. The control logic, when executed by processors 205, causes processors 205 to perform the functions of the invention as described herein. In another embodiment, the present invention is implemented primarily in hardware using, for example, a hardware state machine. Implementation of the hardware state machine so as to perform the functions described herein will be apparent to those skilled in the relevant arts.

Input devices of input-output devices 260 could include any of a variety of known devices for accepting information from a user, whether a human or a machine, whether local or remote. Such devices include, for example a keyboard, mouse, touch-screen display, touch pad, microphone with a voice recognition device, network card, or modem. Output devices of input-output devices 260 could include any of a variety of known devices for presenting information to a user, whether a human or a machine, whether local or remote. Such devices include, for example, a video monitor, printer, audio speaker with a voice synthesis device, network card, or modem. Input-output devices 260 could also include any of a variety of known removable storage devices, including a compact disk drive, a tape drive, a removable hard disk drive, or a diskette drive.

As shown in FIG. 2, host signal 101 and watermark signal 102 typically are loaded into computer system 110A through one or more of the input devices of input-output devices 260A. Alternatively, signals 101 and/or 102 may be generated by an application executed on computer system 110A or another computer system (referred to herein as "computer-generated" signals). Received composite signal with noise 105 typically is acquired by receiver 125 and loaded into computer system 110B through one or more of the input devices of input-output devices 260B. Also, reconstructed watermark signal 106 typically is output from computer system 110B through one or more of the output devices of input-output devices 260B. Computer system 110A typically is coupled to transmitter 120 through one or more output devices of input-output devices 260A, and computer system 110B typically is coupled to receiver 125 through one or more input devices of input-output devices 260B.

Embedder-extractor 200 could be implemented in the "C" or "C++" programming languages, or in an assembly language. It will be understood by those skilled in the relevant art that many other programming languages could also be used. Also, as noted, embedder-extractor 200 may be implemented in any combination of software, hardware, or firmware. For example, it may be directly implemented by micro-code embedded in a special-purpose microprocessor. If implemented in software, embedder-extractor 200 may be loaded into memory storage devices 250 through one of input-output devices 260. All or portions of embedder-extractor 200 may also reside in a read-only memory or similar device of memory storage devices 250, such devices not requiring that embedder-extractor 200 first be loaded through input-output devices 260. It will be understood by those skilled in the relevant art that embedder-extractor 200, or portions of it, may typically be loaded by processors 205 in a known manner into memories 230 as advantageous for execution.

Information Embedder 201

Figure 3:
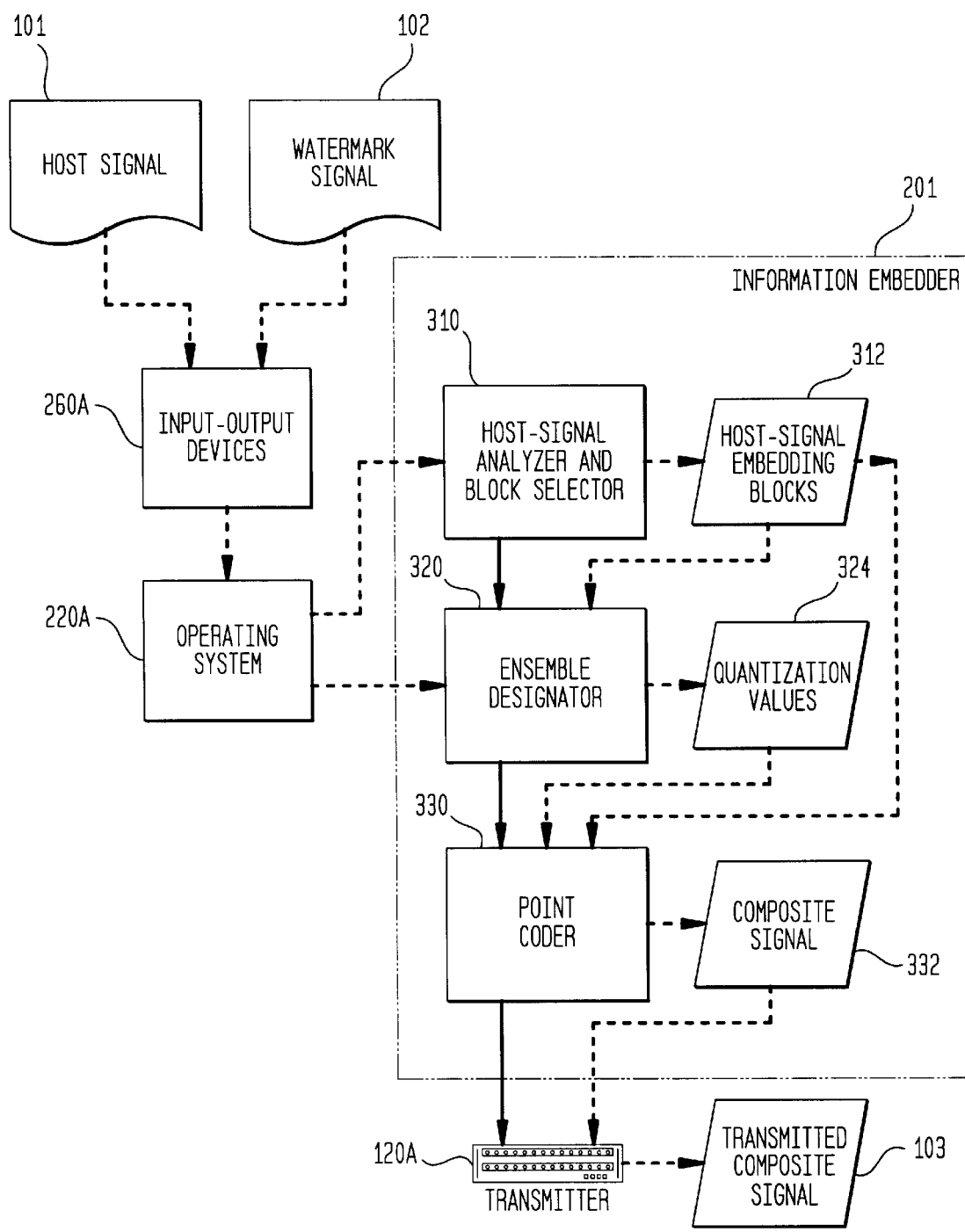
FIG. 3 is a functional block diagram of the information embedder of FIG. 2.

As noted, information embedder 201 embeds watermark signal 102 into host signal 101 to produce composite signal 103 that may be transmitted or otherwise distributed or used. Specifically, with respect to the illustrated embodiment, information embedder 201 generates an ensemble of two or more dithered quantizers that produce dithered quantization values, each such dithered quantizer corresponding to a possible value of a co-processed group of components of a watermark signal. Information embedder 201 also changes selected values of the host signal to the closest of certain dithered quantization values. Such dithered quantization values are those generated by the particular dithered quantizer of the ensemble of dithered quantizers that corresponds to the value of the portion of the watermark signal that is to be embedded. FIG. 3 is a functional block diagram of information embedder 201 that, as shown, includes host-signal analyzer and block selector 310, ensemble designator 320, and point coder 330.

Host-signal analyzer and block selector 310 analyzes host signal 101 to select host-signal embedding blocks in which watermark signal 102 is to be embedded. Ensemble designator 320 designates two or more dithered quantizers, one for each possible value of a co-processed group of components of watermark signal 102. Each dithered quantizer generates non-intersecting dithered quantization values. The dithered quantizers generated by ensemble designator 320 designate dithered quantization values selected in accordance with the maximum allowable watermark-induced distortion level, expected channel-induced distortion level, and/or a desired intensity of a selected portion of the watermark signal in the host-signal embedding blocks. Point coder 330 codes host-signal values of the host-signal components of the selected portions of the host signal in the embedding blocks. Such coding is done in the illustrated embodiment by changing such host-signal values to the closest dithered quantization value.

Host-Signal Analyzer and Block Selector 310

As noted, host-signal analyzer and block selector (hereafter, simply "selector") 310 operates on host signal 101. It will be understood that host signal 101 may be a transformed, encoded, encrypted, smoothed, or otherwise processed, signal. For example, a process commonly known as discrete cosine transformation may have been applied to a host signal that is an image. Any other of many known techniques or processes, or others to be developed in the future, may have been applied by various processing modules (not shown) to produce host signal 101. Such known processes include, for example, JPEG or MPEG compression, Fourier transformation, wave length transformation, or lapped orthogonal transformation.

For illustrative purposes, it is assumed that host signal 101 is a digital signal, which may be a digitized version of an analog signal. In alternative embodiments, host signal 101 may be an analog signal, or a combination analog and digital signal. Typically, host signal 101 is externally selected by a user and made available for processing by computer system 110A in accordance with known techniques, or it is a computer-generated signal. In alternative embodiments, however, selector 310 may select host signal 101 by, for example, consulting a look-up table (not shown) of host signals into which watermark signals are to be embedded, or using other techniques.

Figure 4A:
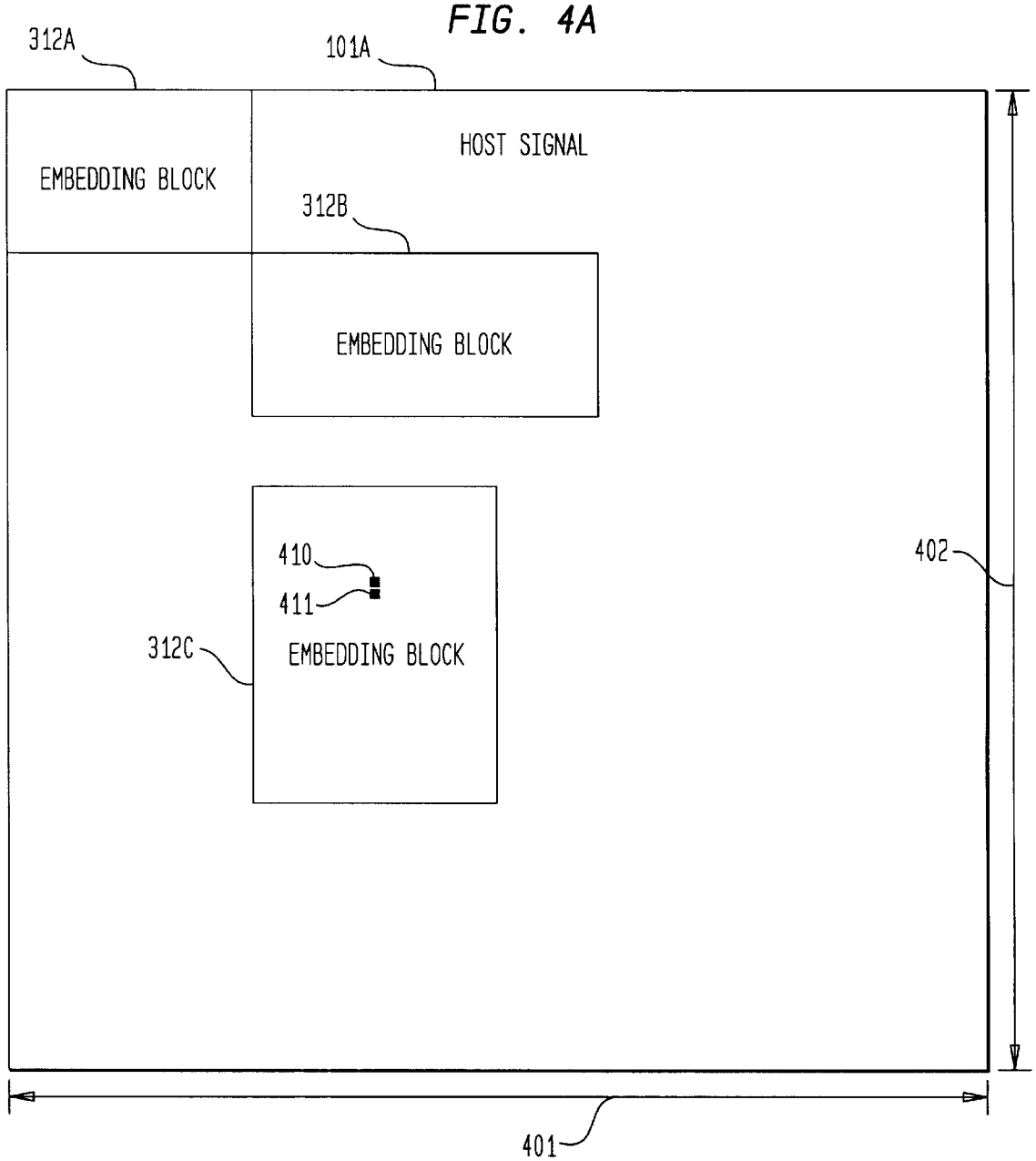
FIG. 4A is a graphical representation of an illustrative example of a host signal into which a watermark signal is to be embedded by the information embedder of FIGS. 2 and 3.

Selector 310 optionally selects one or more blocks, generally and collectively referred to as host-signal embedding blocks 312, from host signal 101. For illustrative purposes, it is assumed that host signal 101 is a black and white image, a simplified graphical representation of which is shown in FIG. 4A. It is also so assumed that dimensions 401 and 402 of host signal 101 are each 256 pixels long, i.e., the image of host signal 101 consists of 65,536 pixels. Each of such pixels has a grey-scale value that, in the illustrative example, is a real number. It will be understood that, in other illustrative examples, such grey-scale values may be otherwise represented.

As noted, the described functions of selector 310 are illustrated with respect to pixels of an image, but embedder-extractor 200 is not so limited. In particular, a pixel is an illustrative example of what is referred to herein more generally as a host-signal component. The grey-scale value of a pixel similarly is an illustrative example of what is referred to herein more generally as a host-signal value. Other examples of host-signal values and host-signal components include the RGB (red-green-blue) value of a pixel, the luminance and chrominance values of a pixel, the amplitude or linear predictive coefficient of a speech sample, and so on.

In the illustrative example of FIG. 4A, selector 310 selects blocks of pixels of host signal 101 that are graphically represented by embedding blocks 312A–C. Selector 310 may employ any of a variety of factors in making such selection, some of which factors may depend on the embedding application. For example, the application may be one in which an identification number is to be embedded in a particular copy of a copyrighted image so that the identification number may not be removed without compromising the image. In such an application, selector 310 may employ any of a variety of known, or to-be-developed, techniques to determine which regions of host signal 101 contain significant, or significant amounts of, information. The reason for selecting such high-information areas is that unauthorized attempts to manipulate them to extract the watermark signal are more likely to be noticed. For example, one such technique would be to identify areas in which there is a greater amount of diversity in the grey-scale values of pixels than in other areas. Other factors typically employed by selector 310 are the amount of information to be embedded in the selected embedding block; the availability of various resources of computer system 11A, such as the amount of available memory in memory 230A or the speed of processor 205A; the desirability of embedding a watermark signal in a location in the host signal that is likely to be subject to tampering (in relation to other locations in the host signal); and the desirability of embedding a watermark signal in a location that is relatively less likely to result in distortion to the host signal or is relatively easier to extract. The relevance of such factors is described below with respect to the functions of dimensionality determiner 710 of FIG. 7.

For illustrative purposes, it is assumed that, in a particular implementation, selector 310 selects embedding block 312C. As described below, selector 310 may select any number of embedding blocks between 1 and 65,536 in the illustrative example; that is, all of host signal 101 may be an embedding block, or each pixel of host signal 101 may be an embedding block. Also, he embedding block may be continuing; that is, for example, host signal 101 may include a continuing signal stream into which a watermark signal is embedded at various points in the stream. Further, embedding blocks may have any configuration, e.g., they need not be rectangles as shown in FIG. 4, and they need not be contiguous. In accordance with any of a variety of known, or to-be-developed, techniques, selector 310 identifies those pixels included in embedding block 312C by determining its boundaries, or other indicator of placement within host signal 101, such as offset from the beginning of host signal 101. As described below with respect to the operations of information extractor 202, such block identification may be used in a known manner to synchronize received composite signal with noise 105 with transmitted composite signal 103. Such synchronization enables information extractor 202 to identify a block of pixels corresponding to embedding block 312C even if a portion of transmitted composite signal 103 has not been received or is distorted.

Ensemble designator 320

As noted, ensemble designator 320 of the illustrated embodiment generates two or more dithered quantizers, one for each possible value of a co-processed group of components of watermark signal 102. Also as noted, a dithered quantizer is a type of embedding generator. In alternative embodiments, ensemble designator 320 may generate embedding generators that are not dithered quantizers.

Figure 4B:
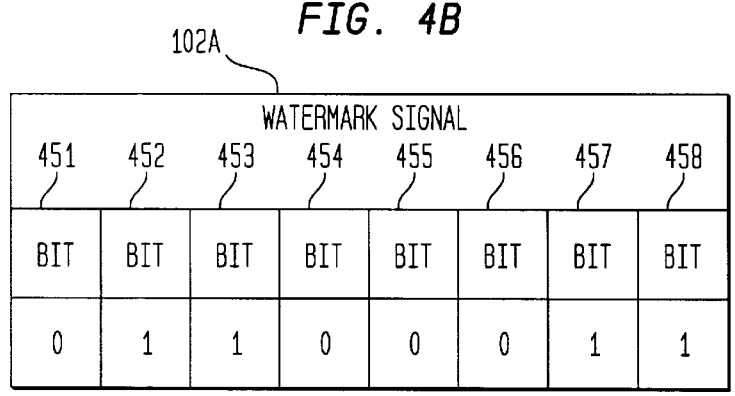
FIG. 4B is a graphical representation of an illustrative example of a watermark signal to be embedded in the host signal of FIG. 4A by the information embedder of FIGS. 2 and 3.

FIG. 4B is one illustrative embodiment of watermark signal 102 that is an eight-bit message; for example, a binary serial number. There are thus 256 possible serial numbers. As is evident, such illustrative serial numbers may be the binary numbers themselves, or the binary numbers may represent numbers, text, or other representations contained in a look-up table, or other data structure, indexed by the binary numbers or related pointers. In FIG. 4B, the bits of the illustrative serial number are labeled 451–458, with bit 451 being the most significant bit (or "high" bit), and bit 458 being the least significant bit (or "low" bit). Each of bits 451–458 is a component of watermark signal 102. In the illustrative example of such binary components, each component may thus have one of two watermark-signal values, typically 0 or 1.

Watermark signal 102 may be a transformed, coded, encrypted, or otherwise processed, version of an original watermark signal (not shown). For example, one or more of bits 451–458 of exemplary watermark signal 102 of FIG. 4B may constitute parity bits, or other error-detection bits, that have been added to an original watermark signal by an error-detection/error-correction device (not shown). Also, as noted, watermark signal 102 in alternative examples need not be a binary, or other digital, signal. It may be an analog signal, or a mixed digital-analog signal.

Each dithered quantizer generates non-intersecting and uniquely mapped dithered quantization values. One "one-dimensional" implementation of the generation of such dithered quantization values is shown in FIG. 5C. The term "one-dimensional" means in this context that a watermark-signal component, or group of co-processed watermark-signal components, is embedded in one host-signal component, i.e., one pixel in the illustrated embodiment. The term "two-dimensional" is used herein, for example with respect to FIGS. 8A and 8B, to mean that a watermark-signal component, or group of co-processed watermark-signal components, is embedded in two host-signal components, i.e., two pixels in the illustrated embodiment.

More generally, the number of dimensions may be any integer up to the number of host signal components in the host-signal embedding block (or in the host signal, if there is only one such block constituting the entire host signal). Thus, any one (or any combination, as noted below) of bits 451–458 may be embedded in one, two, or any integer up to 65,536, pixel(s) of host signal 101 of FIG. 4A. As described below with respect to dimensionality determiner 710 of FIG. 7, more than one watermark-signal component (i.e., more than one bit in the illustrative example) may be embedded in one or more host signal components. For example, two bits may be embedded in two pixels. Watermark-signal components thus embedded together in one or more host signal components are referred to as a group of co-processed watermark-signal components.

Figure 5A:
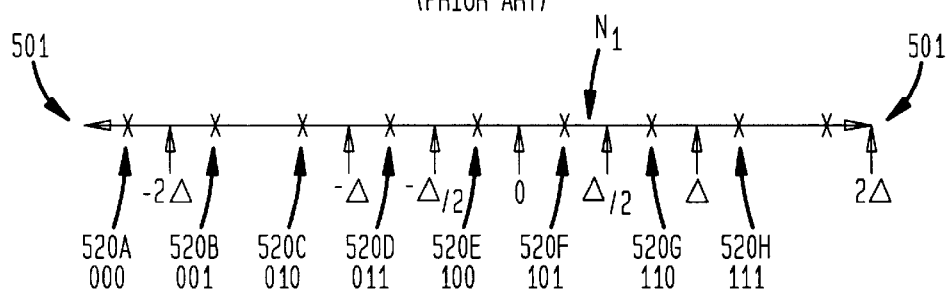
FIG. 5A is a graphical representation of a real-number line with respect to which a known technique for simple quantization may be applied.
Figure 5B:
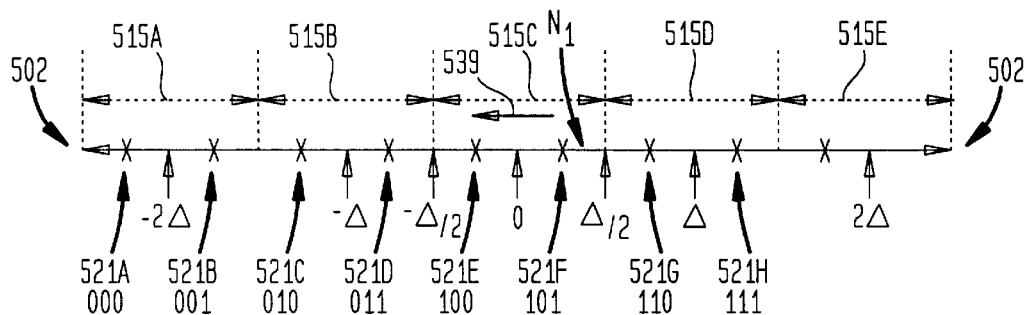
FIG. 5B is a graphical representation of a real-number line with respect to which a known technique for low-bit modulation may be applied.
Figure 5C:
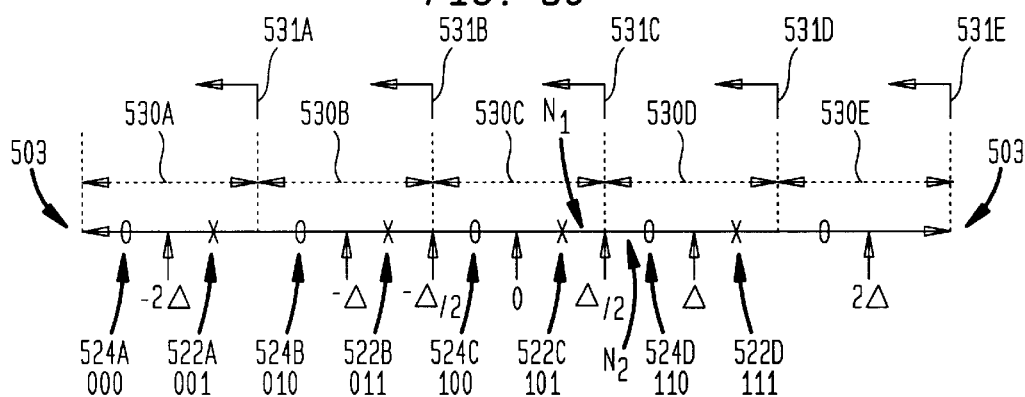
FIG. 5C is a graphical representation of a real-number line with respect to which a first embodiment of an ensemble of two dithered quantizers generates one embodiment of dithered quantization values in accordance with the operations of one embodiment of a quantizer ensemble designator of the information embedder of FIG. 3.
Figure 5D:
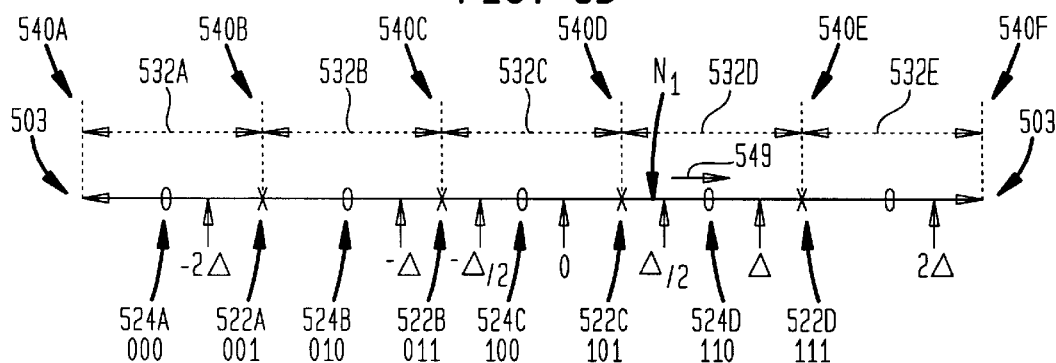
FIG. 5D is an alternative graphical representation of the real-number line of FIG. 5C.
Figure 6A:
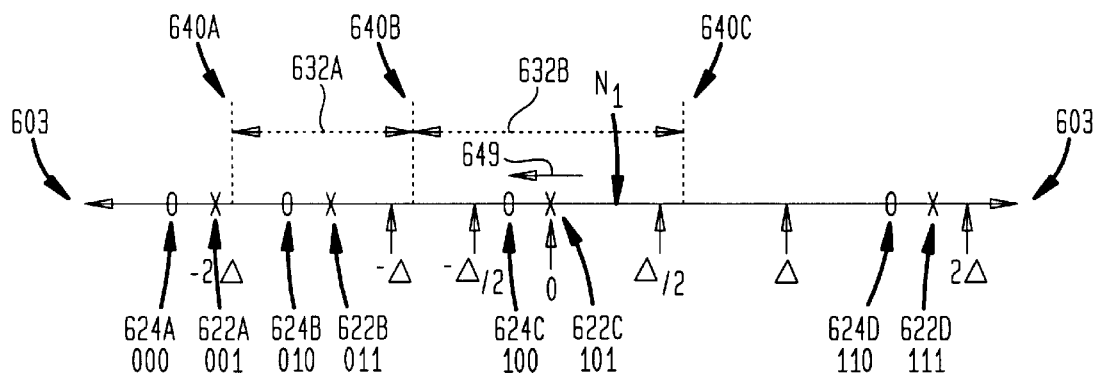
FIG. 6A is a graphical representation of a real-number line with respect to which a second embodiment of an ensemble of two dithered quantizers has generated one embodiment of dithered quantization values in accordance with the operations of one embodiment of a quantizer ensemble designator of the information embedder of FIG. 3.
Figure 6B:
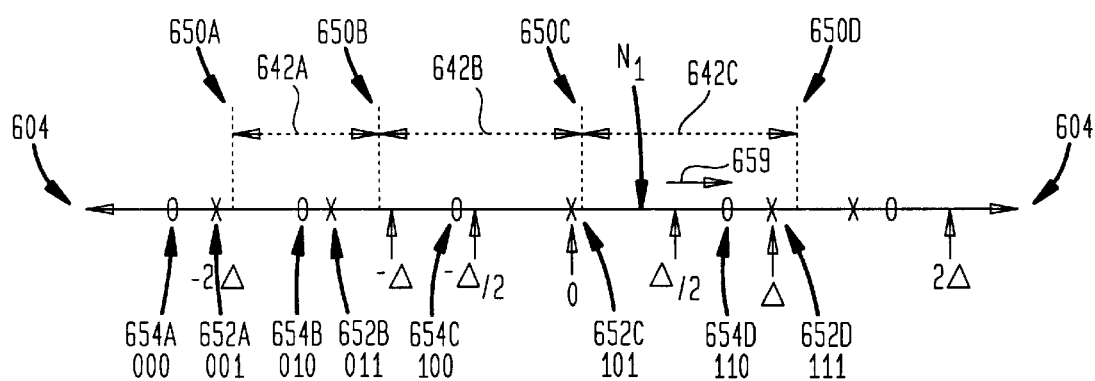
FIG. 6B is a graphical representation of a real-number line with respect to which one embodiment of an ensemble of two embedding generators, which are not dithered quantizers, have generated one embodiment of embedding values in accordance with the operations of one embodiment of a quantizer ensemble designator of the information embedder of FIG. 3.

Reference is now made to FIGS. 5A–D and FIGS. 6A and 6B that show illustrative examples of quantization (FIG. 5A), quantization and low-bit modulation (FIG. 5B), the generation of quantization values using dithered quantization (FIGS. 5C, 5D, and 6A), and the generation of embedding values using an embedding generator that is not a dithered quantizer (FIG. 6B). More specifically, FIG. 5A is a graphical representation of real-number line 501 with respect to which is illustrated the simple quantization of a real number using a known technique. FIG. 5B is a graphical representation of real-number line 502 upon which is illustrated the quantization and modulation of a real number using the known technique of low-bit modulation. FIG. 5C is a graphical representation of real-number line 503 upon which is illustrated the dithered quantization of a host-signal value, i.e., the embedding of a watermark-signal component using one embodiment in which a pair of dithered quantizers are employed in accordance with the present invention. FIG. 5D is an alternative graphical representation of real-number line 503 of FIG. 5C. FIG. 6A similarly shows the operations of a pair of dithered quantizers in accordance with the present invention, except that whereas the quantization values generated by each of the dithered quantizers of FIGS. 5C and 5D are regularly and evenly spaced, such regularity is not present with respect to the quantization values of FIG. 6A. FIG. 6B shows the operations of a pair of embedding generators in accordance with the present invention that are not dithered quantizers.

The Simple Quantizer of FIG. 5A: The simple quantization technique illustrated in FIG. 5A is used to quantize a real number to an integer so that, for example, it may be represented by a binary number. Such quantization and binary representation commonly are done to facilitate digital storage, manipulation, or other processing of the host signal that requires, or benefits from, the use of binary numbers rather than real numbers. Such simple quantization is not a watermarking technique because it does not embed a watermark signal in a host signal. However, some of the terms applicable to watermarking techniques may usefully be illustrated by reference to FIG. 5A.

For purposes of illustration, it is assumed that the real number to be quantized is the real number $N_1$ on real-number line 501 of FIG. 5A. Points to the right of "0" on line 501 are positive, and points to the left are negative. According to one known simple quantizing technique, the real number $N_1$ is quantized by changing it to the nearest of a series of quantization values. Such values are indicated by the points on axis 101 labeled with the symbol "X," such as points 520A–H, generally and collectively referred to as quantization values 520.

Typically, but not necessarily, quantization values 520 are regularly and evenly spaced. In the illustrated example, quantization values 520 are spaced a distance $\Delta/2$ apart; that is, the simple quantizer of FIG. 5A has a "step size" of $\Delta/2$. It is assumed for illustrative purposes that the first positive quantization value, labeled 520F, is located at a point $\Delta/4$ on line 501. Thus, the next positive quantization value 520G is located one step size distant at point $3/4\Delta$, and so on. In the illustrated example, and following a common implementation, each of quantization values 520 is represented by a binary number. As shown in FIG. 5A, the binary representations for the exemplary quantization values are: "000" for value 520A, "001" for value 520B, "010" for value 520C, "011" for value 520D, "100" for value 520E, "101" for value 520F, "110" for value 520G, and "111" for value 520H. It will be understood by those skilled in the relevant art at many other binary representations, and other representational schemes, may be used.

In this illustrative example, the host-signal value $N_1$, located at $3/8 \Delta$, is changed to quantization value 520F, which is the quantization value that is closest in value to $N_1$. As will be evident to those skilled in the relevant art, the distortion introduced by the quantization of host-signal value $N_1$ is related to some measure of distance, e.g., differences in value, between the values of $N_1$ and 520F.

The Low-Bit Modulation Technique of FIG. 5B: As noted, FIG. 5B is a graphical representation of real-number line 502 upon which i is illustrated the known quantization technique for watermarking commonly referred to as low-bit modulation. It is assumed for illustrative purposes that real number $N_1$, located at $3/8 \Delta$ on real-number line 502, is to be so quantized. In accordance with this known technique, three steps typically are performed.

First, quantization values typically are generated by a single quantizer (referred to herein as the "LBM quantizer"). The quantization values so generated typically are regularly and evenly spaced. For convenience of illustration and comparison, it is assumed that such quantization values are located and spaced as described above with respect to the quantization values of FIG. 5A. It is also assumed that the quantization values of the low-bit modulation technique of FIG. 5B are represented by binary numbers in the same manner as described above with respect to the simple quantization technique of FIG. 5A. The quantization values generated by the LBM quantizer of FIG. 5B are quantization values 521 A–H, generally and collectively referred to as quantization values 521.

The second step typically performed is to quantize $N_1$ in the same manner as described above with respect to the simple quantization technique of FIG. 5A. That is, $N_1$ tentatively is quantized to the closest quantization value; i.e., to the closest of quantization values 521 (referred to herein as the "tentative LBM quantization value"). Thus, $N_1$ is tentatively quantized to quantization value 521F, which, in the illustrated example, is represented by the binary number "101."

The third step typically performed is to modulate $N_1$ either by adopting the tentative LBM quantization value as the final value, or by changing the tentative LBM quantization value to the one other of quantization values 521 that differs from the tentative LBM quantization value only in the low bit. That is, the final quantization value of $N_1$ either is the tentative LBM quantization value, or it is the tentative LBM quantization value with its low bit changed. In the illustrative example, $N_1$ thus would be quantized either to "101" (521F), or to "100" ( 521E), depending on the value of the modulating signal.

For illustrative and comparative purposes, the intervals in which the binary representations of LBM quantization values 521 differ only in the low bit are shown in FIG. 5B as quantization intervals 515A–E, generally and collectively referred to as quantization intervals 515. The value to be quantized according to the LBM technique thus is quantized to one of a pair of quantization values 521 falling within the same quantization interval as is located, the value to be quantized. In the illustrative example, $N_1$ thus is quantized to one of the two quantization values 521 located in quantization interval 515C, the selection of the value being dependent upon the value of the modulating signal. For purposes of illustration, it is assumed that the modulating signal is a bit having a value of "0," and that the modulation of such value is implemented by selecting as the final quantization value the value that differs from the tentative LBM quantization value by the low bit. Thus, the final quantization value is quantization value 521E, which differs from the nearest quantization value (521F) only in the low bit. The amount of distortion introduced by the quantization of $N_1$ to quantization value 521E is represented in FIG. 5B by the length of distortion line 539. Significantly, the amount of such distortion is greater than would have been introduced by quantizing $N_1$ to quantization value 521G, which is closer to $N_1$ but differs from quantization value 521F in two bits rather than in just the low bit.

The One-Dimensional, Dithered, Quantization Technique of FIGS. 5C, 5D, and FIG. 6A: FIG. 5C is a graphical representation of real-number line 503 upon which is illustrated a one-dimensional dithered quantization of a host-signal value, $N_1$, in accordance with the present invention. Quantization values 522 and 524, represented by "X's" and "O's," respectively, are generated by two dithered quantizers generated by ensemble designator 320. Two dithered quantizers are generated in the illustrative example because one bit of a watermark signal is to be embedded in the host signal. That is, because a single bit may have one of two values, typically "0" or "1," one dithered quantizer is generated so that it may generate one or more quantization values corresponding to one of such bit values, and the second dithered quantizer is generated to generate quantization values corresponding to the other of such bit values.

In the illustrated embodiment, one dithered quantizer generates quantization values 522A–D, and the other dithered quantizer generates quantization values 524A–D, generally and collectively referred to as quantization values 522 and 524, respectively. In particular, for illustrative purposes, it is assumed that one of such dithered quantizers, referred to as the "X quantizer," generates quantization values 522 corresponding to a watermark signal bit of value "1" and shown in FIG. 5C by the "X" symbol on real-number line 503. Similarly, the second dithered quantizer, referred to as the "O quantizer," generates quantization values 524 corresponding to a watermark signal bit of value "0" and shown by the symbol "O." In the embodiment shown in FIGS. 5C and 5D, quantization values 522 and quantization values 524 are regularly and evenly spaced for illustrative purposes although, as noted, it need not be so.

It is further assumed for illustrative and comparative purposes that $N_1$ is located at 3/8 $\Delta$, that quantization values 522 and 524 have a step size $\Delta$, that they are offset from each other by a distance $\Delta/2$, and that the first positive quantization value (522C) is located at a point $\Delta/4$ on real-number line 503. As shown in FIG. 5C, the binary representations for the exemplary quantization values are: "000" for value 524A, "001" for value 522A, "010" for value 524B, "011" for value 522B, "100" for value 524C, "101" for value 522C, "110" for value 524D, and "111" for value 522D. It will be understood by those skilled in the relevant art that many other binary representations, and other representational schemes, may be used, and that the exemplary values of $N_1$, quantization values 522, and quantization values 524, are chosen for illustrative purposes and that many other such values may be chosen.

In contrast to the implementation of the low-bit modulation technique described above, the dithered quantization technique represented in FIG. 5C adds or subtracts a dither value from the value of $N_1$ before quantization (thus moving $N_1$ to the right or left, respectively, on real-number line 503). Alternatively stated, the quantization interval in which N, is located (the "$N_1$ interval") is shifted by the dither value, but in the direction opposite to that in which $N_1$ may be shifted. That is, a shift of $N_1$ to the right is equivalent to a shift of the $N_1$ interval to the left, and vice versa.

The dither value is the real-number value that will result in an interval boundary nearest to $N_1$ being located at a midpoint between two quantization values generated by the dithered quantizer that corresponds to the watermark-signal value that is to be embedded. In particular, one of the two values is the closest quantization value to $N_1$, and the other quantization value is; on the opposite side of $N_1$ from such closest quantization value. For convenience of reference, such closest quantization value is referred to herein as the "close-value boundary determiner" and such other quantization value is referred to as the "far-value boundary determiner."

For example, with reference to FIG. 5C and 5D, it is assumed for illustrative purposes that the watermark-signal value to be embedded is "0." Thus, $N_1$ is to be mapped to the closest one of quantization values 524 generated by the O quantizer; that is, to the closest of the "O" symbols on real-number line 503. The closest value to $N_1$ generated by the O quantizer is quantization value 524D, which is thus the close-value boundary determiner. The quantization value generated by the O quantizer that is on the opposite side of $N_1$ is quantization value 524C, and is thus the far-value boundary determiner. The $N_1$-interval boundary closest to N, therefore is located at the midpoint between quantization values 524C (located at $-\Delta/4$) and 524D (located at 3/4 $\Delta$), as shown by boundary line 540D of FIG. 5D (located at $\Delta/4$). Such placement of boundary line 540D is achieved by choosing the dither value, in the illustrative example, to be the real number $\Delta/4$. Alternatively described in terms of FIG. 5C, a dither value of $\Delta/4$ is added to $N_1$, thereby generating a real number representing the dithered value of the host-signal value, shown as $N_2$.

As shown in FIG. 5D, boundary line 540D is one of boundary lines 540 that also include boundary lines 540A–C, and 540 E–F. All of boundary lines 540 are similarly located at mid-points between adjacent quantization values 524. Such location of boundary lines 540 of FIG. 5D may be described as a shift of $\Delta/4$ to the left of quantization intervals 530 of FIG. 5C, as indicated by shift lines 531A–E of FIG. 5C. FIG. 5D is therefore an alternative representation of real-number line 503 after such interval shift is implemented. If the watermark-signal value to be embedded had been assumed to be "1," then $N_1$ would be mapped to the closest one of quantization values 522 generated by the X quantizer of FIG. 5C and 5D, and boundary lines at mid-points between adjacent quantization values 522 would have been employed in determining the dither value.

The distortion introduced by the dithered quantization of FIG. 5D is represented by the distance between the value $N_1$ and the one of quantization values 524 that is located in the same quantization interval as $N_1$, i.e., quantization value 524D. Such distortion is represented by the distance of distortion line 549. Significantly, and in contrast to the low-bit modulation technique described above, dithered quantization provides that the host-signal value is quantized to the closest quantization value corresponding to the watermark-signal value to be embedded.

The designation of boundaries defining quantization intervals typically enables efficient, and/or quick, processing by computer systems 110A and 110B. In particular, it generally is more efficient and faster to map a host-signal value to a quantization value by identifying the interval in which the host-signal value is located, rather than by calculating the distances from the host-signal value to various quantization values and determining which is the closest. Mapping by reference to quantization intervals may be accomplished, for example, by the use of a look-up table (not shown) stored in memory 230A by ensemble designator 320 to correlate the location of the host-signal value with a quantization interval and with the quantization value that falls within that interval. In alternative embodiment, any other of a variety of known techniques for associating data may be used.

Such a look-up table may include, in one implementation, a column of real-number entries identifying the starting values of quantization intervals (such as $\Delta/4$ for interval 532D of FIG. 5D) and another column of real-number entries identifying the ending values of such quantization intervals (such as $5/4\ \Delta$ for interval 532D). Each row (hereafter referred to as a record) in such implementation therefore provides the starting and ending real numbers of a quantization interval. In accordance with the illustrative techniques described above with respect to FIGS. 5C, 5D, 6A, and 6B, each quantization interval includes within its boundaries only one quantization value corresponding to the watermark-signal value to be embedded. Thus, each record of the look-up table may further include a third column having entries that identify the particular quantization value associated with the quantization interval of that record. Quantizing $N_1$, for example, may thus be accomplished by using any of a variety of known search and compare techniques to scan the entries in the first and second columns of the look-up table to find the record having start and end values that encompass the real-number value of $N_1$. The value of $N_1$ may then be quantized to the value of the entry in the third column of that record.

The use of dithered quantizers is advantageous because dithered quantization values generated by one dithered quantizer may be used to generate dithered quantization values for any other dithered quantizer simply by adding or subtracting an offset value. That is, as noted, each of the dithered quantization values generated by any one of an ensemble of dithered quantizers differs by an offset value (i.e., are shifted) from corresponding dithered quantization values generated by each other dithered quantizer of the ensemble. Thus, for example, if there are at least three dithered quantizers in the ensemble, and the first generates the dithered quantization values $V_1$, $V_2$, and $V_3$, then the second dithered quantizer generates dithered quantization values $V_1+A$, $V_2+A$, and $V_3+A$, where A is an offset value that may be a real number. The third dithered quantizer generates dithered quantization values $V_1+B$, $V_2+B$, and $V_3+B$, where B is an offset value that is not equal to A, and so on with respect to all of the dithered quantizers. For convenience, quantization values $V_1$, $V_1+A$, and $V_1+B$, are referred to herein as "corresponding" dithered quantization values.

Although the distance between any two corresponding dithered quantization values generated by two dithered quantizers is thus always constant, the distance between two dithered quantization values generated by any one dithered quantizer generally need not be constant. That is, for example, the distance between $V_1$ and $V_2$ may be different than the distance between $V_2$ and $V_3$. FIG. 6A shows an implementation of dithered quantization in which dithered quantization values 624A–D generated by the O dithered quantizer are not regularly and evenly spaced, as they are in FIGS. 5C and 5D. Similarly, dithered quantization values 622A–D generated by the X dithered quantizer are not regularly and evenly spaced. However, the distance between X's and O's is constant because they differ by a constant offset value.

With respect to FIG. 6A, it is again assumed for illustrative and comparative purposes that the watermark-signal value is "0," corresponding to the O dithered quantizer. Therefore, as with respect to boundary lines 540 of FIG. 5D, boundary lines 640 (lines 640A–C) of FIG. 6A are located at the midpoints between adjacent O's, thereby defining quantization intervals 632A–B. If the watermark-signal value to be embedded had been "1," boundary lines would be located at the midpoints between adjacent X's. A watermark-signal component having the watermark-signal value "0" is embedded in host-signal value $N_1$ by quantizing $N_1$ to the closest of embedding values 624; e.g., by quantizing $N_1$ to the dithered quantization value that is within the $N_1$ interval. In the illustrative example of FIG. 6A, $N_1$ is located in quantization interval 632B that is defined by boundary lines 640B and 640C. The dithered quantization value within this interval is dithered quantization value 624C; thus, it is the closest quantization value to $N_1$.

The distortion introduced by such dithered quantization is represented by the length of distortion line 649. It is provided that such distortion is less than would be introduced by choosing any other quantization value 624 because quantization value 624C is the closest of such values to $N_1$.

Alternatively stated, such least distortion is provided because both $N_1$ and dithered quantization value 624C are located within the same quantization interval, and because the boundaries of quantization intervals are set by locating them at the midpoint between adjacent dithered quantization values in the manner described above.

The One-Dimensional Quantization Technique of FIG. 6B: As noted, ensemble designator 320 is not limited to embodiments implementing dithered quantization techniques.

FIG. 6B shows one alternative embodiment in which embedding generators that are not dithered quantizers generate embedding values that are not dithered quantization values. That is, embedding values 654A–D generated by the O embedding generator are not regularly and evenly spaced, embedding values 652A–D generated by the X embedding generator are not regularly and evenly spaced, and the distance between X's and O's is not constant; i.e., they do not differ by a constant offset value as would be the case for a dithered quantizer. It will be understood that FIG. 6B is illustrative of one embodiment only, and, in alternative non-dithered quantizer embodiments (i.e., there is not a constant offset value), the embedding values generated by any one or more embedding generators may be regularly and/or evenly spaced.

With respect to FIG. 6B, it is assumed for illustrative and comparative purposes that the watermark-signal value is "0," corresponding to the O embedding generator. Therefore, boundary lines 650A–D are located at the midpoints between adjacent O's, thereby defining quantization intervals 642A–C. If the watermark-signal value to be embedded had been "1," boundary lines would be located at the midpoints between adjacent X's. Host-signal value $N_1$ is embedded in the watermark-signal component (which has the watermark-signal value "0") by quantizing $N_1$ to the embedding value of embedding values 654 that is within the $N_1$ interval, i.e., within the quantization interval defined by the boundary lines within which $N_1$ is located. In the illustrative example of FIG. 6B, $N_1$ is located in quantization interval 642C that is defined by boundary lines 650C and 650D. The embedding value within this interval is embedding value 654D. The distortion introduced by such quantization is represented by the length of distortion line 659. It is provided that such distortion is less than would be introduced by choosing any other embedding value 654 because embedding value 654D is the closest of such values to $N_1$.

Figure 7:
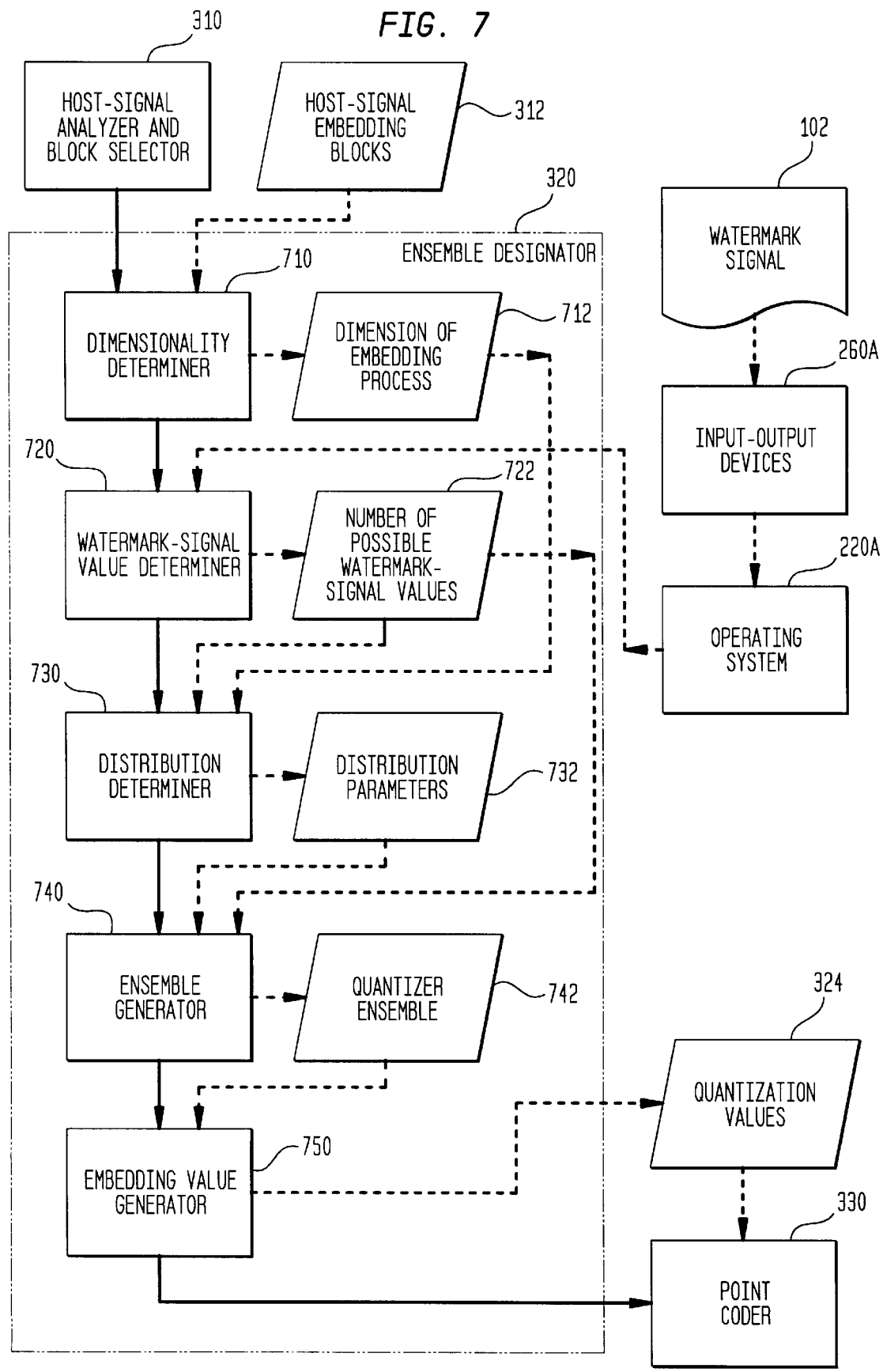
FIG. 7 is a functional block diagram of one embodiment of a quantizer ensemble designator of the information embedder of FIG. 3.

The operations of ensemble designator 320 are now further described in reference to FIG. 7, which is a functional block diagram of designator 320. As shown in FIG. 7, designator 320 includes dimensionality determiner 710 that determines the number of co-processed host-signal components into which one or more watermark-signal values are to be embedded. Designator 320 also includes watermark-signal value determiner 720 that determines how many watermark-signal components to embed in such co-processed host-signal components, and the number of possible values of each co-processed watermark-signal component. Designator 320 further includes distribution determiner 730 that determines parameters governing the distribution of quantization values. Also included in designator 320 is ensemble generator 740 that generates an ensemble of quantizers capable of generating non-intersecting and uniquely mapped quantization values. Designator 320 further includes embedding value generator 750 that generates the non-intersecting and uniquely mapped quantization values determined by the quantizers generated by ensemble generator 740.

Dimensionality Determiner 710. Host-signal analyzer and block selector 310 provides to dimensionality determiner 710 an identification of host-signal embedding blocks 312. Dimensionality determiner 710 determines the number of co-processed host-signal components of blocks 312 into which one or more watermark-signal values are to be embedded. Such number is referred to herein as the dimension of the embedding process, shown with respect to the illustrated embodiment as dimension of embedding process 712. As noted, the number of dimensions may be any integer up to the number of host signal components in the host-signal embedding block. For convenience, the relative terms "low-dimensional" and "high-dimensional" will be used to refer to the co-processing of relatively small numbers of host signal components as contrasted with the co-processing of relatively large numbers of host signal components, respectively.

Dimensionality determiner 710 determines dimension 712 by considering any one or more of a variety of factors, including the amount of available memory in memory 230A or the speed of processor 205A. For example, a high-dimensional embedding process may require that greater amounts of information regarding the location of embedding values be stored in memory 230A than may be required with respect to a low-dimensional embedding process. Such greater memory resource usage may pertain, for example, if the locations of embedding values are stored in look-up tables, rather than, for example, being computed from formulas.

Moreover, if the embedding values are generated by the use of formulas rather than accessing the contents of look-up tables, the speed at which processor 205A is capable of calculating the locations in a high-dimensional embedding process may be slower than the speed at which it could calculate locations in a low-dimensional embedding process. Thus, the embedding process may not be acceptably quick if high-dimensional embedding is undertaken. In some embodiments, designator 320 may similarly take into account the available memory and processor speed in the information extracting computer system 110B, i.e., the capabilities of memory 230B and processor 205B. The availability of such resources may be relevant because extracting a watermark signal may require similar look-up tables consuming memory space, or make similar demands on processor speed with respect to the calculation of formulas.

However, a choice of a low-dimensional embedding process may impose similar strains on computer resources. For example, although the time required to calculate the locations of embedding values using a processor 205 of a particular speed may be greater for high-dimensional processing than for low-dimensional processing, such cost may be offset by other considerations. For instance, it may be faster to co-process two host-signal components together than to process them separately. It will be understood by those skilled in the relevant art that the balancing of such considerations may be influenced by the computer-system architecture, the processor architecture, the programming languages involved, and other factors. As another, nonlimiting, example, it may be desirable to employ a high-dimensional embedding process to provide relatively less quantization-induced distortion as compared to a low-dimensional process using the same number of quantization values per dimension.

Watermark-Signal Value Determiner 720. In accordance with known techniques, operating system 220A provides watermark signal 102 to watermark-signal value determiner 720. As noted, watermark-signal value determiner 720 determines how many watermark-signal components to embed in the co-processed host-signal components. Such number is represented in FIG. 7 as number of possible watermark-signal values 722.

Figure 8A:
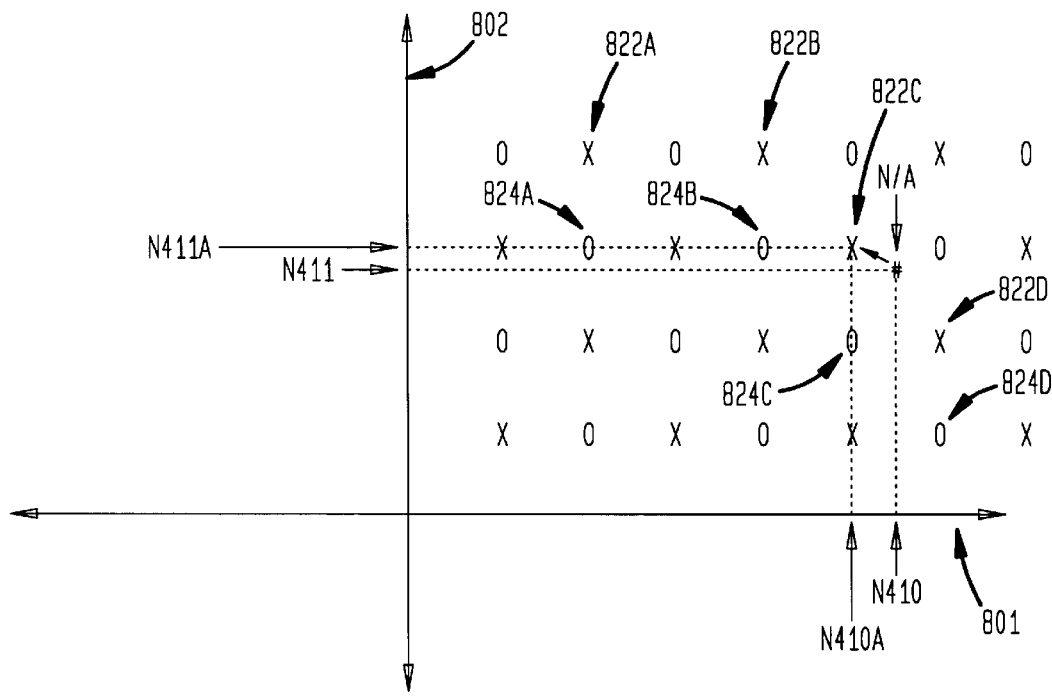
FIG. 8A is a graphical representation of one illustrative example of two-dimensional watermarking of an exemplary host signal with an exemplary watermark signal in accordance with the operations of one embodiment of a quantizer ensemble designator of the information embedder of FIG. 3.

For example, in FIG. 8A it is determined that one watermark-signal component is to be embedded in the number of co-processed host-signal components determined by dimensionality determiner 710. For illustrative purposes, it is assumed that the watermark signal is watermark signal 102 of FIG. 4B, and that the host signal is host signal 101 of FIG. 4A. Thus, with respect to FIG. 8A, one bit is to be embedded in two pixels. In the alternative example of FIG. 8B, watermark-signal value determiner 720 determines that two watermark-signal components are to be embedded in two pixels. More generally, determiner 720 may determine that any one, or any combination of, watermark-signal components are to be co-processed. For example, with respect to FIG. 4B, bits 451 and 453 may be co-processed together, bits 452 and 454 may be co-processed together, and so on. As another example, bit 451 may be co-processed by itself, bit 452 may be processed by itself, bits 453 and 454 may be co-processed together, and so on.

The determination of the number of co-processed watermark-signal components may be based on a variety of factors. One factor is the amount of channel noise 104 that is anticipated. Generally, as the amount of anticipated noise increases, the number of watermark-signal components that may desirably be co-processed decreases. This relationship follows because the greater the number of co-processed watermark-signal components, the greater the number of quantizers, and thus the greater the number of quantization values, that are employed. For example, the co-processing of one bit employs two quantizers, two bits employs four quantizers, three bits employs eight quantizers, and so on. Thus, for a given average quantization-induced distortion, as the number of co-processed watermark-signal components increases, the distance between quantization values of different quantizers decreases.

This relationship may be seen by referring to FIGS. 5C (one co-processed bit). The distance between X and O quantization values is Δ/2. However, if it were desired to add a Y quantizer, the distance between X and Y quantization values, or between O and Y quantization values, would necessarily be less than Δ/2. Thus, for a fixed amount of channel noise 104, it is more likely that such noise will result in a decoding error. Therefore, if channel noise distortion is anticipated to be high, it is less desirable to co-process larger numbers of watermark-signal values.

Another factor in determining the number of co-processed watermark-signal components is the length of the watermark signal. As the number of bits in a watermark signal increases, for example, the desirability of increasing the number of co-processed watermark-signal components may increase. This relationship generally pertains because, for a given number of total host-signal components, the average number of watermark bits per host-signal component increases with the total number of watermark bits. Yet another factor is the dimensionality determined by dimensionality determiner 710. Generally, the larger the dimensionality, the larger the number of co-processed watermark-signal components that may be employed without increasing the likelihood of decoding error. This relationship pertains because, for the same minimum distance between quantization values of different quantizers, more quantizers can be employed if there are more dimensions.

In alternative embodiments, the number of watermark-signal components to embed in each co-processed group of host-signal components may be predetermined. Also in some embodiments, such number may be user-selected by employing any of a variety of known techniques such as a graphical user interface.

As also noted, watermark-signal value determiner 720 determines the number of possible values of each co-processed watermark-signal component. Such determination is made in accordance with any of a variety of known techniques, such as using a look-up table (not shown). For example, with respect to watermark signal 102 of FIG. 4B, it is assumed for illustrative purposes that there is stored in memory 230A a look-up table that includes both watermark signal 102 and an indicator that indicates that the components of such signal are binary values; i.e., that each such component may have two possible values: "0" and "1." Such indicator may be predetermined; that is, all watermark signals, or watermark signals of any predetermined group, may be indicated to be hexadecimal. In alternative embodiments, the number of possible watermark-signal values may be user-determined by employing any of a variety of known techniques such as a graphical user interface.

Distribution Determiner 730. Distribution determiner 730 determines distribution parameters 732 that govern the distribution of quantization values. Distribution parameters 732 may be contained in a table or any other known data structure. Distribution parameters 732 typically include the determined density of quantization values (i.e., how closely they are located to each other); a specifier of the shape of the quantization intervals; and other parameters. The shape of the quantization intervals may be a factor because quantization-induced distortion may vary depending on such shape. For example, in two-dimensional space, a hexagonal shape may be more desirable than a rectangular shape, assuming that the same number of quantization values occupy each such shape (i.e., the shapes have the same area). In particular, the average quantization-induced distortion is less for the hexagonal shape than for the rectangular shape because the average square distance to the center is less for a hexagon than for a rectangle of the same area.

The density of quantization values may vary among the quantization values corresponding to a possible watermark-signal value. For example, the density may be high for some O quantization values corresponding to a "0" watermark-signal value and low for other O quantization values. Also, in embodiments in which dithered quantization is not employed, such density may vary between quantization values corresponding to one watermark-signal value and quantization values corresponding to another watermark-signal value. For example, the density may be high for O quantization values and low for X quantization values.

In reference to FIGS. 5C and 5D, it is assumed for illustrative purposes that distribution determiner 730 determines that the quantization values generated by the O quantizer are evenly spaced over real-number line 503. In contrast, with reference to FIG. 6A, it is determined that the quantization values generated by the O quantizer are unevenly spaced over real-number line 603. For example, quantization values 624A and 624B are more closely distributed with respect to each other than are quantization values 624B and 624C. Such uneven distribution may be advantageous, for example, if host-signal values are more likely to be concentrated in some areas of real-number line 603 than in other areas. In general, the distribution of larger numbers of quantization values in areas of higher concentration provides less distortion due to quantization than would be the case if the distribution had been more sparse.

It generally is advantageous, from the point of view of reducing quantization-induced distortion, to more densely distribute the quantization values irrespective of the anticipated relative concentration of host-signal values. Thus, from this perspective, even if the quantization values are to be evenly spaced (because host-signal values are not more likely to be concentrated in some areas), denser distribution is desirable. However, denser distribution of quantization values also generally increases the possibility that other noise sources, such as, for example, channel noise 104 of FIGS. 1 and 2, will result in an erroneous decoding of the watermark signal.

For example, with respect to FIG. 5D, channel noise 104 may result in received-composite-signal-with-noise 105 having a composite signal component that is distorted to a position on real-number line 503 that is closer to the X quantization value 522D than to the O quantization value 524D. In such a case, as described in greater detail below with respect to point decoder 930, the composite signal component generally is erroneously interpreted as representing the watermark-signal value represented by the X quantization values, even though the corresponding component of transmitted composite signal 103 had been quantized to an O quantization value. The likelihood of such an error occurring generally decreases as the X and O quantization values are more spread apart. As an illustrative example, it is assumed that $N_1$ is quantized to the O quantization value 524D (located at 3/4 Δ) and that channel noise 104 results, in the corresponding component of received signal 105 being displaced to the value 3/8 Δ on real-number line 503 (i.e., a displacement of 3/8 Δ to the left). Point decoder 930 may then erroneously decode such component as representing the embedding of the watermark-signal value corresponding to the X quantization values. Such error may occur because 3/8 Δ is closer to quantization value 522C (located at Δ/4) than to quantization value 524D (located at 3/4 Δ). If the X and O quantization values had been more spread apart, for instance at a distance Δ from each other, rather than Δ/2 as in FIG. 5D, then the same noise displacement of 3/8 Δ to the left would not have resulted in an erroneous decoding since the value of the composite-signal component with noise would have remained closer to quantization value 524D than to quantization value 522C.

Thus, an additional factor that may be considered by distribution determiner 730 is the amount of expected channel noise 104, and, more particularly, its expected magnitude range and/or frequency of occurrence. Other factors that may be so considered include the total number of quantization values generated by all of the quantizers. A higher number of total quantization values generally provides that quantization-induced distortion will be decreased because the distance is likely to be less from the host-signal value(s) to the closest quantization value corresponding to the watermark-signal value to be embedded. Also, the bandwidth of communication channel 115, the instruction word architecture and other architectural aspects of computer system 110A, and the capacities of memory 230A, may be additional factors. The greater the total number of quantization values, the larger the size of the binary representations, for example, required to identify each quantization value. The length of such binary representation may exceed the allowed instruction word size. Also, the amount of space in memory 230A may not be sufficient to store the larger amounts of information related to the generation of larger numbers of quantization values. As the amount of such information to be transmitted over communication channel 115 increases, bandwidth limitations of the channel may require an increasing of the transmission time.

Combinations of such factors may also be considered by distribution determiner 730. For example, determiner 730 may determine distribution parameters 732 so that they specify quantizers that are capable of generating dithered quantization values selected in accordance with a balance between or among the maximum allowable watermark-induced distortion level, expected channel-induced distortion level, a desired intensity of a selected portion of the watermark signal in the host-signal embedding blocks, and/or other factors. For example, with respect to the maximum allowable watermark-induced distortion level, the possibility of decoding errors generally decreases as the distance between adjacent quantization values increases, as previously noted. However, the watermark-induced distortion increases as such distance increases. Therefore, such distance may be limited by the maximum distortion that is acceptable to a user, or that is predetermined to be a maximum allowable distortion. The factor of channel-induced distortion may be related to such determination, since it may be desirable to minimize the likelihood of decoding errors.

The balance between minimizing decoding errors and increasing watermark-induced distortion typically varies depending upon the application. For example, it may be anticipated that channel noise 104 will be small or essentially non-existent. Such condition typically pertains, for instance, if communication channel 115 is a short length of fiber optic cable, as compared to a long-distance radio channel. As another non-limiting example, small or non-existent channel noise may be anticipated if composite signal 332 is to be stored directly (i.e., without the use of a lossy compression technique or other distortion-inducing signal processing) on a floppy disk and the communication channel consists simply of accessing such signal from the disk. Many other examples of direct signal processing will be evident to those skilled in the relevant art. Also, anticipate noise in a communication channel may effectively be nullified by application of any of a variety of known error-detection/correction techniques. In any such case of small anticipated channel noise, the distance between adjacent quantization values may be made small, thereby minimizing watermark-induced distortion while not providing a significant likelihood of erroneous decoding.

As noted, the desired intensity of a selected portion of the watermark signal in a host-signal embedding block may also be a factor in determining distribution parameters 732. In one application, for example, an embedding block may be present that contains essential information, is without which the host signal is not recognizable, or otherwise useful for its intended purpose. Placing the watermark signal in such an embedding block may be desirable because deletion or other alteration of the watermark signal might require elimination of such essential host-signal information. Therefore, it may be desirable or necessary, in order to embed the watermark signal in such block, to increase the dimensionality of the embedding process.

As noted, the distribution of quantization values may occur in one, two, or other number of dimensions. In the illustrated embodiment, dimension 712 is thus provided by dimensionality determiner 710 to distribution determiner 730. As described below in relation to point coder 330, such distributions may occur in accordance with Euclidean, or non-Euclidean, geometries. In one alternative embodiment, the distribution of quantization values may be user-selectable by use of a graphical user interface or other known or to-be-developed technique.

Ensemble generator 740. Employing distribution parameters 732, ensemble generator 740 generates an ensemble (two or more) of dithered quantizers, referred to as quantizer ensemble 742. Quantizer ensemble 742 includes a dithered quantizer for each possible value of a co-processed group of components of watermark signal 102. The number of such possible values, and thus the number of dithered quantizers, is provided to generator 740 by watermark-signal value determiner 720 (i.e., by providing number-of-possible-watermark-signal values 722). Each such dithered quantizer is capable of generating non-intersecting and uniquely mapped quantization values.

As noted, a dithered quantizer is a type of embedding generator. In alternative embodiments, ensemble generator 740 may generate embedding generators that are not dithered quantizers. Each of such quantizers may be a list, description, table, formula, function, other generator or descriptor that generates or describes quantization values, or any combination thereof.

For example, with respect to FIG. 5D, it is assumed for illustrative purposes that distribution parameters 732 specify that the O and X quantization values are both to be regularly and evenly spaced. The O quantizer may thus be a list of locations on real-number line 503 at which the O quantization values are to be situated (e.g., 3/4 Δ; 7/4 Δ; and so on). The entries in such list may be calculated, predetermined, user-selected, or any combination thereof. Also, the O quantizer, according to the illustrative example, may be a formula specifying that each O quantization value is located at a distance Δ/4 to the left of integer multiples of Δ. By way of further illustration, the X quantizer may be a formula that specifies that the X quantization values are calculated by adding a value (Δ/2 in the example of FIG. 5D) to each of the O quantization values.

Embedding value generator 750. Embedding value generator 750 generates the quantization values 324 determined by the quantizers of quantizer ensemble 742. Quantization values 324 are non-intersecting and uniquely mapped. Embedding value generator 750 may, but need not, employ all of such quantizers. For example, if the possible number of watermark signal values is three (e.g., "0," "1," and "2"), and the watermark signal to be embedded includes only the values "0" and "1," then only the dithered quantizers corresponding to values "0" and "1" typically need be employed by embedding value generator 750.

Embedding value generator 750 may employ any of a variety of known or to-be-developed techniques for generating quantization values as specified by the quantizers of quantizer ensemble 742. For example, if the quantizers of quantizer ensemble 742 are, for example, lists, then generating quantization values is accomplished by accessing the list entries., i.e., the locations of the quantization values. As another example, if the quantizers of quantizer ensemble 742 include a formula, then generating quantization values is accomplished by calculating the location results specified by the formula. Quantization values 324 are provided by embedding value generator 750 to point coder 330.

Point Coder 330

Point coder 330 embeds watermark-signal components into one or more host-signal components. Such embedding is done in the illustrated embodiment by changing the host-signal values of such host-signal components to the closest dithered quantization value. More generally, i.e. in alternative embodiments that do not exclusively employ dithered quantizers, point coder 330 may change the host-signal values to embedding values that are not dithered quantization values.

In the exemplary illustrations of FIGS. 5C, 5D, 6A, and 6B, a Euclidean geometry is represented. Thus, the measure of how close one value is to another (i.e., the distance or distortion between the values) may be measured by the square root of the sums of squares (e.g., the hypotenuse in a two-dimensional, orthogonal, coordinate system). Other measures may also be used in a Euclidean geometry. For example, in an alternative embodiment, a weighted distance may be employed. That is, a distance along one coordinate, or in one dimension, may be weighted differently than a distance along another coordinate or in another dimension. Also, non-Euclidean geometries may be used in alternative embodiments. For example, distance may be measured by third, fourth, or other powers, rather than by squares. Thus, in such alternative embodiments, a quantization interval with respect to a quantization value Q may be defined as the set of all points that are closer (as measured by such alternative geometry) to quantization value Q than they are to other quantization values generated by the same quantizer that generated quantization value Q. In some such embodiments, quantization intervals need not be contiguous regions.

Figure 8B:
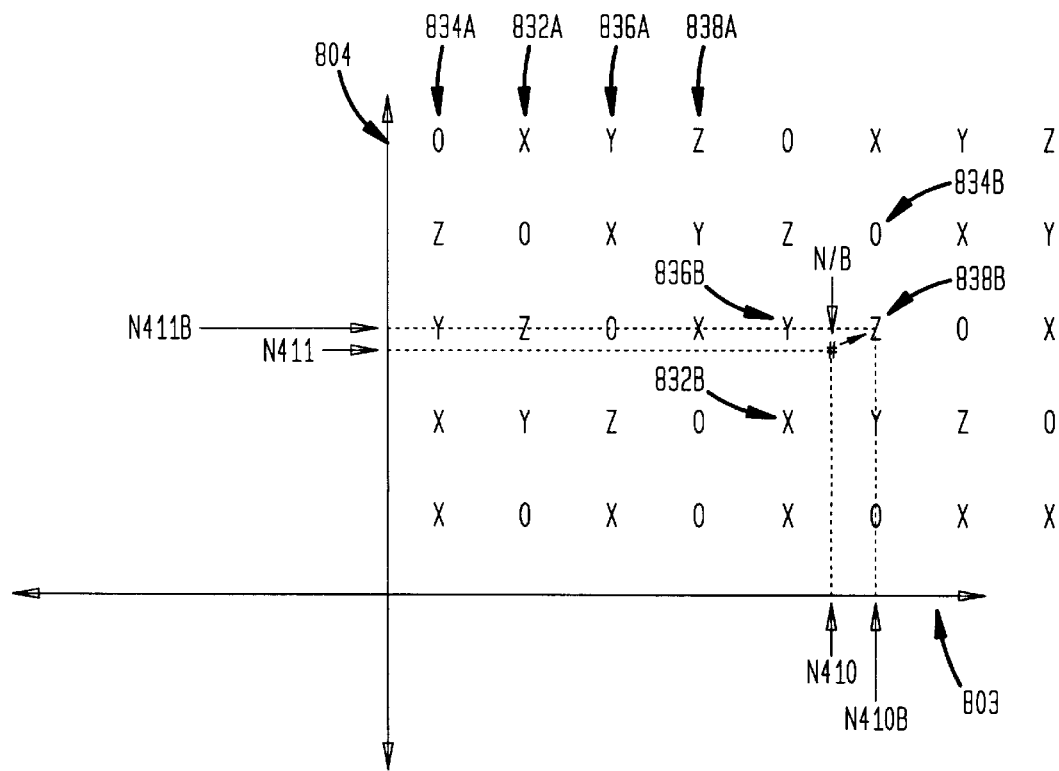
FIG. 8B is a graphical representation of another illustrative example of two-dimensional watermarking of an exemplary host signal with an exemplary watermark signal in accordance with the operations of one embodiment of a quantizer ensemble designator of the information embedder of FIG. 3.

The operations of point coder 330 are now Her described with reference to FIGS. 8.A and 8B. FIG. 8A is a graphical representation of one illustrative example of a two-dimensional embedding process in which one bit of watermark signal 102 of FIG. 4B is embedded in two pixels, pixels 410 and 411, of host signal 101 of FIG. 4A. FIG. 8B is a graphical representation of another illustrative example of a two-dimensional embedding process in which two bits of watermark signal 102 of FIG. 4B are embedded in pixels 410 and 411. More generally, in both FIGS. 8A and 8B, a watermark-signal value is embedded in two host-signal values. The illustrative example of FIG. 8A is an extension to two dimensions of the one-dimensional dithered quantizer, the implementation of which is described above with reference to FIGS. 5C and 5D. That is, it is assumed for illustrative purposes that dimension 712 determined by dimensionality determiner 710 is two. FIG. 8B shows quantization values generated by an embedding generator that is not a dithered quantizer, as the distribution of Y quantization values is not related by a constant offset from the O quantization values, for example.

With reference to FIG. 8A, it is assumed for illustrative purposes that the one bit of watermark signal 102 that is to be embedded in pixels 410 and 411 is the low bit; i.e., bit 458 of FIG. 4B. Thus, the number of co-processed watermark-signal components is one (one bit) and number-of-possible-watermark-signal values 722 determined by watermark-signal value determiner 720 is two (illustratively, "0" and "1").

It is assumed for illustrative purposes that distribution determiner 730 determines distribution parameters 732 such that the quantization values for the two possible watermark-signal values are regularly and evenly distributed in both dimensions. In alternative embodiments, one or both of such sets of quantization values may be regularly and evenly distributed in one dimension, but neither regularly nor evenly distributed in the other dimension, or any combination thereof. It is assumed, as in the previous examples, that the values "0" and "1" correspond respectively with O quantization values generated by an O dithered quantizer and X quantization values generated by an X dithered quantizer. The O and X quantizers, each corresponding to one possible watermark-signal value of the co-processed group of watermark-signal components, thus constitute quantizer ensemble 742 in this illustrative example. Embedding value generator 750 accordingly generates quantization values 324 that are shown in FIG. 8A by the symbols "O" and "X."

Representative X quantization values are labeled 822A–D , and representative O quantization values are labeled 824A–D in FIG. 8A. It is assumed that the host-signal value corresponding to one of the co-processed host-signal components is represented by a point on real-number line 801, and that the host-signal value corresponding to the other co-processed host-signal component is represented by a point on real-number line 802. In particular, it is illustratively assumed that real number N410 on line 801 is the grey-scale value of pixel 410, and that real number N411 on line 802 is the grey-scale value of pixel 411. The point in the two-dimensional space defined by real-number lines 801 and 802 (which are illustratively assumed to be orthogonal, but it need not be so) thus represents the grey-scale values of pixels 410 and 411. This point is represented by the symbol "#" in FIG. 8A, and is referred to as real number pair NA.

Point coder 330, which is assumed to be a dithered quantizer in the illustrated embodiment, embeds bit 458 into pixels 410 and 411. Such embedding is accomplished essentially in the same manner as described above with respect to the one-dimensional embedding of FIGS. 5C, 5D, and 6A, except that a two-dimensional embedding process is illustrated in FIG. 8A. That is, a dither value is added of subtracted from the value of NA before quantization (thus moving NA to the right or left, respectively, with respect to real-number line 801, and moving NA up or down, respectively, with respect to real-number line 802). The dither value need not be the same in each dimension. In FIG. 8A, for example, X quantization value 822C is shown to be offset from O quantization value 824C by a distance in reference to real number line 802, but is not offset with respect to real number line 801.

Alternatively stated, the two-dimensional quantization interval in which NA is located (the "NA two-dimensional interval") is shifted by the dither value, but in the two-dimensional direction opposite to that in which NA may be shifted. That is, a shift of NA to the right and up is equivalent to a shift of the NA interval to the left and down, and vice versa. As noted with respect to the embodiment illustrated in FIGS. 5C and 5D, the dither value is the real-number value that will result in an interval boundary nearest to NA being located at a midpoint between two quantization values generated by the dithered quantizer that corresponds to the watermark-signal value that is to be embedded. For clarity, the interval boundaries are not shown in FIG. 8A.

The value of bit 458 of the illustrative watermark signal 102 is "1." Thus, NA is to be mapped to the closest quantization value generated by the X quantizer; that is, in the illustrative example, to the closest of the "X" symbols in the two-dimensional space defined by real-number lines 801 and 802. As noted, point coder 330 may employ any of a variety of known measures of distance in determining which is the closest of the X quantization values. For example, such measures may be in reference to a Euclidean geometry, a weighted Euclidean geometry, or a non-Euclidean geometry. In the illustrative example of FIG. 8A, such closest value to NA generated by the X quantizer is quantization value 822C. Therefore, NA is mapped to quantization value 822C. That is, the grey-scale value of pixel 410 is changed from the real number N410 to the real number N410A. Similarly, the grey-scale value of pixel 411 is changed from the real number N411 to the real number N411A. The watermark-induced distortion is thus represented by the two-dimensional distance from NA to quantization value 822C.

FIG. 8B, as noted, illustrates one embodiment of a two-dimensional embedding process in which two bits of watermark signal 102 of FIG. 4B are embedded in pixels 410 and 411. Thus, the number of co-processed watermark-signal components is two (two bits) and number-of-possible-watermark-signal values 722 determined by watermark-signal value determiner 720 is four (illustratively, "00," "01," "10," and "11"). In the illustrative example, distribution determiner 730 determines distribution parameters 732 such that the quantization values for the four possible watermark-signal values are not regularly or evenly distributed in both dimensions, although it need not be so in alternative examples. In alternative embodiments, one or more of such sets of quantization values may be regularly and evenly distributed in one dimension, but neither regularly nor evenly distributed in the other dimension, or any combination thereof.

It is illustratively assumed that the values "00," "01," "10," and "11" correspond respectively with O quantization values generated by an O dithered quantizer, X quantization values generated by an X dithered quantizer, Y quantization values generated by a Y dithered quantizer and Z quantization values generated by a Z dithered quantizer. The O, X, Y, and Z quantizers, each corresponding to one possible watermark-signal value of the co-processed group of watermark-signal components, thus constitute quantizer ensemble 742 in this illustrative example.

Embedding value generator 750 accordingly generates quantization values 324 that are shown in FIG. 8B by the symbols "O," "X," "Y," and "Z," representative examples of which are respectively labeled 834A–B, 832A–B, 836A–B, and 838A–B. It is illustratively assumed that real number N410 on real-number line 803 is the grey-scale value of pixel 410, and that real number N411 on real-number line 804 is the grey-scale value of pixel 411. The point in the two-dimensional space defined by real-number lines 802 and 804 (which are illustratively assumed to be orthogonal, but it need not be so) thus represents the grey-scale values of pixels 410 and 411. This point is represented by the symbol "#" in FIG. 8B, and is referred to as real number pair NB.

Point coder 330 embeds two bits into pixels 410 and 411 essentially in the same manner as described above with respect to the embedding of one bit as shown in FIG. 8A. It is assumed for illustrative purposes that the two bits to be embedded are bits 457 and 458 of watermark signal 102 of FIG. 4B. The value of bits 457 and 458 is "11." Thus, NA is to be mapped to the closest quantization value generated by the Z quantizer; that is, in the illustrative example, to the closest of the "Z" symbols in the two-dimensional space defined by real-number lines 803 and 804. Therefore, NB is mapped to quantization value 838B. That is, the grey-scale value of pixel 410 is changed from the real number N410 to the real number N410B. Similarly, the grey-scale value of pixel 410 is changed from the real number N411 to the real number N411B. The watermark-induced distortion is thus represented by the two-dimensional distance from NB to quantization value 838B.

Point coder 330 may similarly embed any number of watermark-signal components in any number of host-signal components using high-dimensional quantizers. In addition, any number of watermark-signal components may be embedded in any number of host-signal components using a sequence of low-dimensional quantizers. For example, one bit may be embedded in 10 pixels using 10, one-dimensional, quantizers. To accomplish such embedding in an illustrative example of dithered quantization, ensemble generator 740 identifies 10 dither values corresponding to the possible "0" value of the bit. Similarly, ensemble generator 740 identifies 10 dither values corresponding to the possible "1" value of the bit. At least one of the dither values of the "0" dither set is different than the corresponding dither value of the "1" dither set. To embed, for example, a watermark-signal component having a value of "0," point coder 330 applies the first dither value of the "0" dither set to the first pixel, the second dither value of the "0" dither set to the second pixel, and so on. Similarly, to embed a watermark-signal component having a value of "1," point coder 330 applies the first dither value of the "1" dither set to the first pixel, the second dither value of the "1" dither set to the second pixel, and so on.

In the illustrated examples, the operations of point coder 330 were described in relation to the embedding of watermark-signal components in one group of co-processed host-signal components. Typically, such operations would also be conducted with respect to other groups of co-processed host-signal components. For example, with respect to watermark signal 102 of FIG. 4B, co-processed bits 457 and 458 may be embedded as described with respect to FIGS. 8A or 8B, co-processed bits 455 and 456 may be so embedded, and so on. Generally, therefore, point coder 330 operates upon one or more groups of co-processed host-signal components, and such operation may be sequential, parallel, or both. Also, the determinations made by determiners 710, 720, and 730 may vary with respect to each group of co-processed host-signal components. For example, dimension 712 may be two for one such group and five for another such group. The number of co-processed watermark-signal components may vary from group to group, and thus number 722 may so vary. Also, the distribution parameters 732 applied to each such group may vary, and thus the quantizers employed with respect to each such group may vary.

Typically, point coder 330 operates upon all co-processed host-signal components; i.e., the entire watermark signal is embedded in one or more selected embedding blocks of the host signal. A host signal so embedded with a watermark signal is referred to herein as a composite signal. Thus, point coder 330 of the illustrated embodiment generates composite signal 332, as shown in FIG. 3. Typically, the composite signal is provided to a transmitter for transmission over a communication channel. Thus, composite signal 332 of the illustrated embodiment is provided to transmitter 120, and transmitted composite signal 103 is transmitted over communication channel 115, as shown in FIG. 2. However, in alternative embodiments, composite signal 332 need not be so provided to a transmitter. For example, composite signal 332 may be stored in memory 230A for future use.

Information Extractor 202

Figure 9:
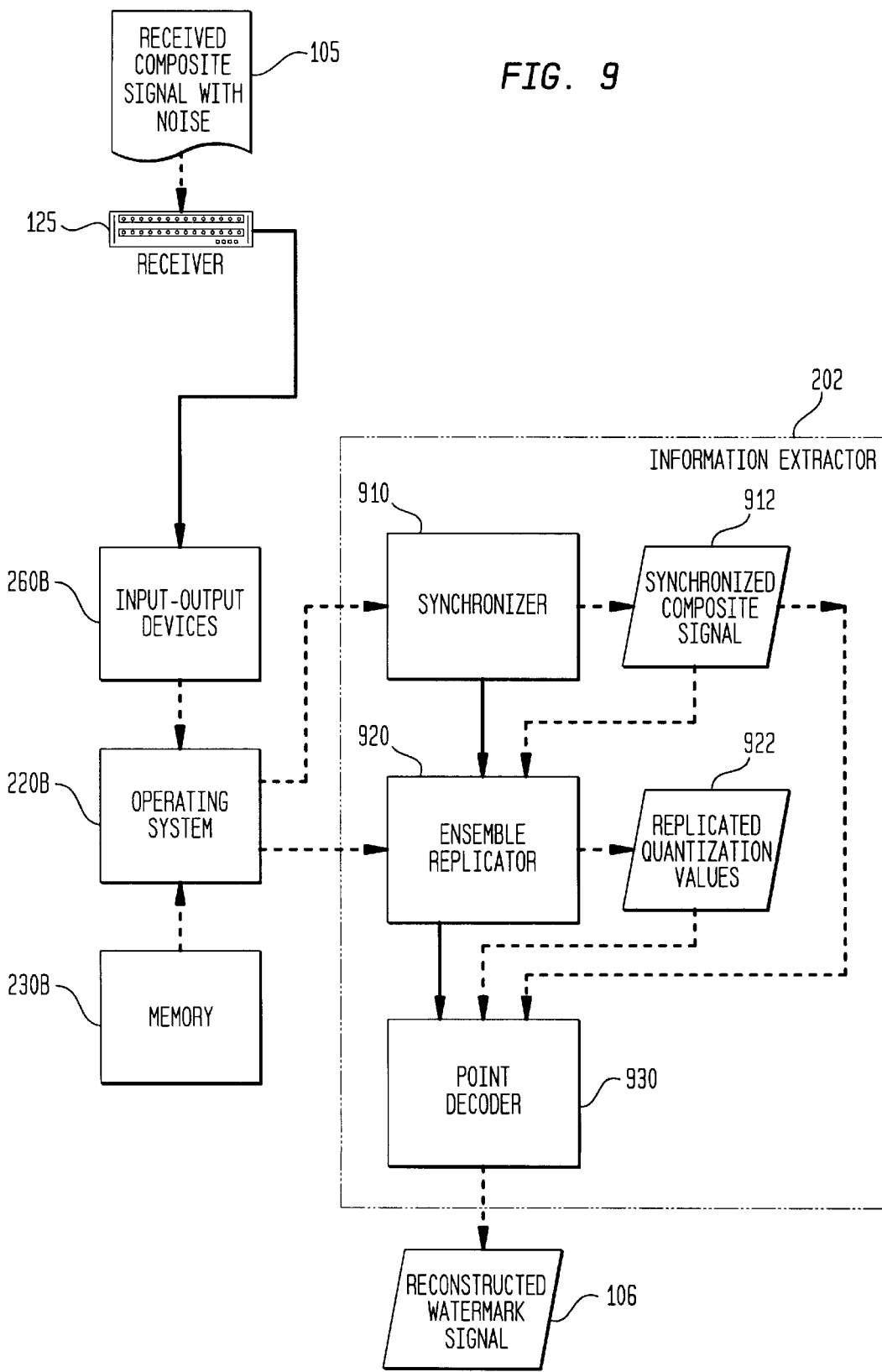
FIG. 9 is a functional block diagram of the information extractor of FIG. 2.

FIG. 9 is a functional block diagram of information extractor 202 of FIG. 2. In the illustrated embodiment, information extractor 202 receives from receiver 125 (via an input device of input-output devices 260B and operating system 220B) received composite signal with noise 105. As shown in FIG. 9, information extractor 202 includes synchronizer 910 that synchronizes signal 105 so that the location of particular portions of such signal, corresponding to portions of transmitted composite signal 103, may be determined. Information extractor 202 also includes ensemble replicator 920 that replicates the ensemble of embedding generators and embedding values that information embedder 201 generated. As noted, such replication may be accomplished in one embodiment by examining a portion of the received signal. In alternative embodiments, the information contained in the quantizer specifier may be available a priori to information extractor 202. The replicated embedding generators of the illustrated embodiment are dithered quantizers, and the embedding values are dithered quantization values. Information extractor 202 further includes point decoder 930 that, for each co-processed group of components of the watermark signal, determines the closest dithered quantization value to selected values of the host signal, thereby reconstructing the watermark signal.

Synchronizer 910

Synchronizer 910 of the illustrated embodiment may be any of a variety of known devices for synchronizing transmitted and corresponding received signals. In particular, synchronizer 910 provides that components of received signal 105 may be identified and associated with components of composite signal 332. For example, in the illustrated embodiment in which watermark signal 102 is embedded in embedding block 312C, including pixels 410 and 411, synchronizer 910 provides that the beginning of embedding block 312C may accurately be identified.

In one known implementation, a synchronization code is added by transmitter 120 to composite signal 332. Such code includes, for example, special patterns that identify the start of composite signal 332 and the start of embedding blocks within composite signal 332. synchronizer 910 finds the synchronization codes and thus determines the start of embedding blocks. Thus, for example, if a portion of transmitted composite signal 103 is lost or distorted in transmission, synchronizer 910 may nonetheless identify the start of embedding block 312C (unless, typically, the transmission of such block is also lost or distorted). Synchronizer 910 similarly identifies other portions of received signal 105, such as the quantizer specifier described below. In such, or any other known manner, synchronizer 910 produces synchronized composite signal 912.

Ensemble replicator 920

As noted, ensemble replicator 920 replicates the ensemble of dithered quantizers and dithered quantization values that information embedder 201 generated. In one embodiment, replicator 920 may perform this function by examining a portion of received signal 105 that is referred to for convenience as the "quantizer specifier" (not shown). The quantizer specifier typically includes information related to dimension 712 applied by dimensionality determiner 710 to each group of co-processed host-signal components, and to distribution parameters 732 determined by distribution determiner 730 with respect to each group of co-processed host-signal components. For example, the quantizer specifier may include the information that, for each group of co-processed host-signal components: dimension 712 is "2"; two dithered quantizers are employed; the dither value is $\Delta/4$; and so on, such that the distribution of dithered quantization values shown in FIG. 5D are described.

Alternatively, memory 230B may include a look-up table (not shown) in which various distributions of dithered quantization values are correlated with an index number. For example, the distribution shown in FIG. 5D may be correlated with a value "1" of the index number, the distribution shown in FIG. 8A may be correlated with a value "2," and so on. In such alternative implementation, the quantizer specifier may include such index value.

In yet another implementation, there need not be a transmitted quantizer specifier. Rather, a default, or standard, description of the distribution of quantization values may be stored in accordance with known techniques in memory 230A to be accessed by ensemble designator 320, and stored in memory 230B to be accessed by replicator 920. For example, a single standard distribution of quantization values may be employed both by information embedder 201 and information extractor 202. That is, for example, it is predetermined that the dimensionality is always "2," the delta value is always $\Delta/4$; and so on. Also, a set of such standard distributions may be used, depending on the characteristics of the host signal; for example, a standard distribution S1 is used for black and white images and standard distribution S2 for color images, a standard distribution S3 is used for images greater than a predetermined size, and so on. Other factors not related to the characteristics of the host signal may also be used, for example, the date, time of day, or any other factor that may be independently ascertainable both by computer system 110A and by computer system 110B may be used. Thus, standard distribution S4 may be used on Mondays, S5 on Tuesdays, and so on.

In accordance with any of such techniques for replicating the quantizer ensemble, replicator 930 generates replicated quantization values 922. Replicator 930 provides values 922 to point decoder 930 for decoding each watermark-signal component embedded in each co-processed group of host-signal components.

Point Decoder 930

FIG. 10 is a graphical representation of one illustrative example of two-dimensional extracting of an exemplary watermark signal from an exemplary host signal in accordance with the operations of point decoder 930. In particular, FIG. 10 shows replicated quantization values 922, and a component of received composite signal with noise 105, corresponding to the quantization values and host-signal component illustrated in FIG. 8A. A representative portion of replicated quantization values 922 are shown by the symbols "O" and "X" in FIG. 10 and are generally and collectively referred to as quantization values 1024 and 1022, respectively. Representative of such quantization values are quantization values 1024A–B and 1022A–B, respectively. Quantization values 1024 and 1022 thus correspond, in this illustrative example, to quantization values 824 and 822, respectively, of FIG. 8.

It is further assumed for illustrative purposes that real numbers N410R and N411R of FIG. 10 represent the grey-scale values of the two received-composite-signal-with-noise components corresponding to the host-signal components in which the watermark-signal component of FIG. 8A was embedded. That is, N410R on real-number line 1001 represents the grey-scale value of pixel 410 as received in received composite signal with noise 105, and N411R on real-number line 1002 represents the grey-scale value of pixel 411 as received in signal 105. As noted with respect to FIG. 8A, the watermark-signal embedded in pixels 410 and 411 is the value of bit 458 of watermark signal 102. Such value is "1," which, in the illustrated example, corresponds to the X quantization values. Thus, the grey-scale values of pixels 410 and 411 are changed to the values N410A and N411A as shown in FIG. 8A. If there is no channel noise 104, then the received grey-scale values of pixels 410 and 411 is the same as the values N410A and N411A. However, it is assumed for illustrative purposes in FIG. 10 that there is channel noise 104. Thus, it is illustratively assumed, the grey-scale values of pixels 410 and 411 as received in signal 105 are distorted due to such noise. The grey-scale values N410R and N411R of FIG. 10, collectively represented in two-dimensional space by the point labeled NR, illustratively represent such distorted grey-scale values of pixels 410 and 411, respectively.

Point decoder 930 determines the closest of quantization values 1024 and 1022 to the point NR. Such determination of proximity may vary depending, for example, on the types of noise most likely to be encountered. For example, the determination may be based on the probability distribution of the noise. As described above, such determination of proximity may also vary depending, for example, on the type of geometry employed which may be specified in the quantizer specifier described with respect to replicator 920, may be a default type, or may otherwise be determined. Furthermore, the determination of closeness need not be the same as that used with respect to the operations of information embedder 201.

In the illustrative example of FIG. 10, the closest quantization value to point NR is X quantizer 1022B. Point decoder 930 therefore determines that the watermark-signal value embedded in pixels 410 and 411 is the value corresponding to the X quantization values 1022, which is the value "1." Point decoder similarly typically processes each other group of co-processed host-signal components as received in signal 105. Thus, the values of all embedded watermark-signal components are extracted from signal 105. Such extracted watermark values are represented in FIGS. 1, 2, and 9 as reconstructed watermark signal 106.

Having now described one embodiment of the present invention, it should be apparent To those skilled in the relevant art that the foregoing is illustrative only and not limiting, having been presented by way of example only. Many other schemes for distributing functions among the various functional modules of the illustrated embodiment are possible in accordance with the present invention. The functions of any module may be carried out in various ways in alternative embodiments. In particular, but without limitation, numerous variations are contemplated in accordance with the present invention with respect to identifying host-signal embedding blocks, determining dimensionality, determining distribution parameters, synchronizing a received composite signal, and replicating quantization values.

In addition, it will be understood by those skilled in the relevant art that control and data flows between and among functional modules of the invention and various data structures (such as, for example, data structures 712, 722, 732, and 742) may vary in many ways from the control and data flows described above. More particularly, intermediary functional modules (not shown) may direct control or data flows; the functions of various modules may be combined, divided, or otherwise rearranged to allow parallel processing or for other reasons; intermediate data structures may be used; various data structures may be combined; the sequencing of functions or portions of functions generally may be altered; and so on. Numerous other embodiments, and modifications thereof, are contemplated as falling within the scope of the present invention as defined by appended claims and equivalents thereto.

What is claimed is:

1. A method for watermarking a host signal with a watermark signal, the watermark signal comprising watermark-signal components, each having one of a plurality of watermark-signal values, and the host signal comprising host-signal components, each having one of a plurality of host-signal values, the method comprising:

(1) generating, by each of two or more of a plurality of embedding generators, each corresponding to a single watermark-signal value of one watermark-signal component or a co-processed group of two or more watermark-signal components, a plurality of embedding values, a total of each plurality of embedding values comprising a first embedding-value set, wherein at least one embedding value generated by at least one embedding generator is not the same as any embedding value generated by at least one other embedding generator; and (2) setting at least one host-signal value of one or more selected host-signal components to a first embedding value of a first embedding generator, thereby forming a composite-signal value, wherein the first embedding generator corresponds to a first watermark-signal value of the one watermark-signal component or the co-processed group of watermark-signal components, and when each of the embedding generators is a quantizer, at least one quantization interval of at least one quantizer is not the same as any quantization interval of at least one other quantizer;

wherein, when each of the embedding generators is a dithered quantizer, each having quantization values that are uniformly spaced, and when the composite signal value is transmitted over a channel, then at least one quantization value of any of the dithered quantizers, plus at least one channel noise value capable of being induced by the channel, is not the same value as any of the quantization values of any of the dithered quantizers.

2. The method of claim 1, wherein:
at least one of the plurality of embedding generators is a quantizer.

3. The method of claim 2, wherein:
the at least one quantizer has a dimension that is greater than or equal to two.

4. The method of claim 3, wherein:
the at least one quantizer is a dithered quantizer.

5. The method of claim 2, wherein:
the at least one quantizer has a dimension that is equal to one.

6. The method of claim 5, wherein:
the at least one quantizer is a dithered quantizer.

7. The method of claim 1, wherein:
the first embedding value is an embedding value that is the closest of all embedding values of the first embedding generator in distance to the at least one host-signal value.

8. The method of claim 7, wherein:
the distance is determined by a Euclidean measure.

9. The method of claim 7, wherein:
the distance is determined by a non-uniformly weighted Euclidean measure.

10. The method of claim 7, wherein:
the distance is determined by a non-Euclidean measure.

11. The method of claim 1, wherein step 1 comprises:
generating the plurality of embedding values based on a maximum allowable watermark-induced distortion level and a maximum allowable channel-induced distortion level.

12. The method of claim 11, wherein the maximum allowable watermark-induced distortion level and the maximum allowable channel-induced distortion level have a relationship wherein when one increases the other does not decrease, and when one decreases, the other does not increase.

13. The method of claim 1, wherein step 1 comprises:
generating the plurality of embedding values based on a maximum allowable watermark-induced distortion level, a maximum allowable channel-induced distortion level, and a maximum allowable number of watermark-signal components per host-signal component.

14. The method of claim 13, wherein the maximum allowable watermark-induced distortion level and the maximum allowable channel-induced distortion level have a relationship wherein when one increases the other does not decrease, and when one decreases, the other does not increase.

15. The method of claim 1, wherein step 1 is based on a first predetermined relationship between each of the plurality of embedding values generated by at least one of the plurality of embedding generators.

16. The method of claim 15, wherein step 1 further is based on a second predetermined relationship between a second embedding value generated by one embedding generator and a third embedding value generated by a another embedding generator of the plurality of embedding generators.

17. The method of claim 16, wherein:
the second predetermined relationship is a not a dithered relationship.

18. The method of claim 16, wherein the second predetermined relationship is a dithered relationship.

19. The method of claim 18, wherein the dithered relationship is between quantized embedding values.

20. The method of claim 18, wherein the dithered relationship is between analog embedding values.

21. The method of claim 1, wherein step 1, is based on a first predetermined list including at least one of the plurality of embedding values generated by at least one of the plurality of embedding generators.

22. The method of claim 21, wherein step 1 further is based on a predetermined relationship between a second embedding value generated by the one embedding generator and a third embedding value generated by another embedding generator of the plurality of embedding generators.

23. The method of claim 22, wherein the predetermined relationship is a dithered relationship.

24. The method of claim 1, further comprising:
(3) extracting a reconstructed watermark-signal value from a received composite signal with noise value that includes the composite-signal value and a channel noise value, wherein the reconstructed watermark-signal value represents the first watermark-signal value.

25. The method of claim 24, wherein step 3 comprises:
(a) acquiring the received composite signal with noise value;
(b) replicating one or more embedding values from the first embedding-value set to form a second embedding-value set, at least one embedding value of the second embedding-value set having the same correspondence to a single watermark-signal value as have embedding values of the first embedding-value set from which the at least one embedding value of the second embedding value set is replicated;
(c) selecting a second embedding value of the second embedding-value set, wherein the second embedding value is selected based on its proximity to the received composite signal with noise value; and
(d) setting the reconstructed watermark-signal value to a one of the plurality of watermark-signal values to which the second embedding value corresponds.

26. The method of claim 25, wherein:
the second embedding value is an embedding value that is the closest of all embedding values of the second embedding-value set in distance to the received composite signal with noise value.

27. The method of claim 26, wherein:
the distance is determined by a Euclidean measure.

28. The method of claim 24, wherein the channel noise value is a value not including zero.

29. The method of claim 1, wherein step 1 comprises:
generating the plurality of embedding values based on a maximum allowable watermark-induced distortion level.

30. The method of claim 1, wherein:
each embedding value of the first embedding-value set is a uniquely mapped embedding value.

31. The method of claim 1, wherein:
the watermark signal is determined, at least in part based on the host signal.

32. The method of claim 1, wherein:
the watermark signal is error-correction coded.

33. The method of claim 1, wherein:
the watermark signal is error-detection coded.

34. The method of claim 1, wherein:
the watermark signal is encrypted.

35. The method of claim 1, wherein:
the watermark signal is a transformed signal.

36. The method of claim 1, wherein:
for at least one embedding generator, the embedding values are evenly spaced.

37. The method of claim 1, wherein:
for at least one embedding generator, the embedding values are unevenly spaced.

38. The method of claim 1, wherein:
at least one plurality of embedding values is generated by an embedding generator selected from one or more of the group consisting of a list, description, table, formula, or function.

39. The method of claim 1, wherein:
for at least one host-signal component, the plurality of host-signal values are scalar values.

40. The method of claim 1, wherein:
for at least one host-signal component, the plurality of host-signal values are vector values.

41. The method of claim 1, wherein:
for at least one host-signal component, the plurality of host-signal values represent values of a type selected from one of the group consisting of amplitude, phase, frequency, linear predictive coding coefficient, or non-linear representation.

42. The method of claim 1, wherein:
for at least one watermark-signal component, the plurality of watermark-signal values are scalar values.

43. The method of claim 1, wherein:
for at least one watermark-signal component, the plurality of watermark-signal values are vector values.

44. The method of claim 1, wherein:
the first embedding value is selected based on its proximity to the at least one host-signal value.

45. The method of claim 1, wherein;
at least one embedding value of the first embedding-value set is predetermined.

46. The method of claim 1, wherein:
at least one embedding value of the first embedding-value set is not a quantization value.

47. The method of claim 1, wherein:
the watermark signal comprises an authentication signal.

48. The method of claim 1, wherein:
the watermark signal comprises a digital signature.

49. A method for extracting a reconstructed watermark-signal value from a received composite signal with noise value that includes a composite-signal value and a channel noise value, wherein the reconstructed watermark-signal value represents a first watermark-signal value of a plurality of watermark-signal values of one watermark-signal component or a co-processed group of two or more watermark-signal components of a watermark signal, wherein
the composite-signal value is formed by setting at least one host-signal value of one or more selected host-signal components of a host signal to a first embedding value of a first embedding generator that corresponds to the first watermark-signal value, and when each of the embedding generators is a quantizer, at least one quantization interval of at least one quantizer is not the same as any quantization interval of at least one other quantizer;
and further wherein the first embedding value is one of a first embedding-value set of embedding values generated by a plurality of embedding generators, each of two or more of which generate a plurality of embedding values, wherein at least one embedding value generated by at least one embedding generator of the plurality of embedding generators is not the same as any embedding value generated by at least one other embedding generator of the plurality of embedding generators;
the method comprising:
(1) acquiring the received composite signal with noise value;
(2) replicating one or more embedding values from the first embedding-value set to form a second embedding-value set, at least one embedding value of the second embedding-value set having the same correspondence to a single watermark-signal value as have embedding values of the first embedding-value set from which the at least one embedding value of the second embedding value set is replicated;
(3) selecting a second embedding value of the second embedding-value set, wherein the second embedding value is selected based on its proximity to the received composite signal with noise value; and
(4) setting the reconstructed watermark-signal value to a one of the plurality of watermark-signal values to which the second embedding value corresponds;
wherein, when each of the embedding generators is a dithered quantizer, each having quantization values that are uniformly spaced, and when the composite signal value is transmitted over a channel, then at least one quantization value of any of the dithered quantizers, plus at least one channel noise value capable of being induced by the channel, is not the same value as any of the quantization values of any of the dithered quantizers.

50. The method of claim 49, wherein:
the second embedding value is an embedding value that is the closest of all embedding values of the second embedding-value set in distance to the received composite signal with noise value.

51. The method of claim 50, wherein:
the distance is determined by a Euclidean measure.

52. The method of claim 49, wherein the channel noise value is a value not including zero.

53. The method of claim 49, wherein step (2) comprises:
replicating the one or more embedding values from the first embedding-value set based on at least a portion of the received composite signal with noise.

54. The method of claim 49, wherein step (2) comprises:
replicating the one or more embedding values from the first embedding-value set based on an externally provided specification of a first plurality of embedding values.

55. The method of claim 49, wherein:
the first embedding value is selected based on its proximity to the at least one host-signal value.

56. A system that watermarks a host signal with a watermark signal, the watermark signal comprising watermark-signal components, each having one of a plurality of watermark-signal values, and the host signal comprising host-signal components, each having one of a plurality of host-signal values, the system comprising:
an ensemble generator that generates a plurality of embedding generators, each corresponding to a single watermark-signal value of one watermark-signal component or a co-processed group of two or more watermark-signal components;
an embedding value generator that generates, by each of two or more of the plurality of embedding generators, a plurality of embedding values, the total of each plurality of embedding values comprising a first embedding-value set, wherein at least one embedding value generated by at least one embedding generator is not the same as any embedding value generated by at least one other embedding generator; and
a point coder that sets at least one host-signal value of one or more selected host-signal components to a first embedding value of a first embedding generator, thereby forming a composite-signal value, wherein the first embedding generator corresponds to a first watermark-signal value of the one watermark-signal component or the group of co-processed watermark-signal components, and, when each of the embedding generators is quantizer, at least one quantization interval of at least one quantizer is not the same as any quantization interval of at least one other quantizer, wherein, when each of the embedding generators is a dithered quantizer, each having quantization values that are uniformly spaced, and when the composite signal value is transmitted over a channel, then at least one quantization value of any of the dithered quantizers, plus at least one channel noise value capable of being induced by the channel, is not the same value as any of the quantization values of any of the dithered quantizers.

57. The system of claim 56, wherein:

at least one of the plurality of embedding generators is a quantizer.

58. The system of claim 56, wherein:

the first embedding value is an embedding value that is the closest of all embedding values of the first embedding generator in distance to the at least one host-signal value.

59. The system of claim 56, wherein the ensemble generator generates the plurality of embedding generators based on a maximum allowable watermark-induced distortion level and a maximum allowable channel-induced distortion level.

60. The system of claim 59, wherein the maximum allowable watermark-induced distortion level and the maximum allowable channel-induced distortion level have a relationship wherein when one increases the other does not decrease, and when one decreases, the other does not increase.

61. The system of claim 56, wherein the ensemble generator generates the plurality of embedding generators based on a maximum allowable watermark-induced distortion level, a maximum allowable channel-induced distortion level, and a maximum allowable number of watermark-signal components per host-signal component.

62. The system of claim 61, wherein the maximum allowable watermark-induced distortion level and the maximum allowable channel-induced distortion level have a relationship wherein when one increases the other does not decrease, and when one decreases, the other does not increase.

63. The system of claim 56, wherein the embedding value generator generates a first plurality of embedding values based on a first predetermined relationship between each of the two or more embedding values generated by at least one of the plurality of embedding generators.

64. The system of claim 56, wherein the embedding value generator generates a first plurality of embedding values based on a second predetermined relationship between a second embedding value generated by one embedding generator and a third embedding value generated by another embedding generator of the plurality of embedding generators.

65. The system of claim 64, wherein the second predetermined relationship is a dithered relationship.

66. The system of claim 65, wherein the dithered relationship is between quantized embedding values.

67. The system of claim 66, wherein the dithered relationship is between analog embedding values.

68. The system of claim 56, wherein the embedding value generator generates a first plurality of embedding values based on a first predetermined list including at least one of the plurality of embedding values generated by at least one plurality of embedding generators.

69. The system of claim 68, wherein the embedding value generator further generates a first plurality of embedding values based on a predetermined relationship between a second embedding value generated by one embedding generator and a third embedding value generated by another embedding generator of the plurality of embedding generators.

70. The system of claim 69, wherein the predetermined relationship is a dithered relationship.

71. The system of claim 56, further comprising:

an information extractor that extracts a reconstructed watermark-signal value from a received composite signal with noise value that includes the composite-signal value and a channel noise value, wherein the reconstructed watermark-signal value represents the first watermark-signal value.

72. The system of claim 71, wherein the information extractor comprises:

a synchronizer that acquires a received composite signal with noise that includes the received composite signal with noise value;

an ensemble replicator that replicates one or more embedding values from the first embedding-value set to form a second embedding-value set, at least one embedding value of the second embedding-value set having the same correspondence to a single watermark-signal value as have embedding values of the first embedding-value set from which the at least one embedding value of the second embedding value set is replicated;

a point decoder that selects a second embedding value of the second embedding-value set based on its proximity to the received composite signal with noise value, and that sets the watermark-signal value to a one of the plurality of watermark-signal values to which the second embedding value corresponds.

73. The system of claim 72, wherein the synchronizer is further configured to determine the location of the received composite signal with noise value within the received composite signal with noise.

74. The system of claim 72, wherein the replication is based on an externally provided specification of the first plurality of embedding values.

75. The system of claim 72, wherein:

the second embedding value is an embedding value that is the closest of all embedding values of the second embedding-value set in distance to the received composite signal with noise value.

76. The system of claim 75, wherein:

the distance is determined by a Euclidean measure.

77. The system of claim 72, wherein the channel noise value is a value not including zero.

78. The system of claim 72, further comprising:

a transmitter to receive a composite signal including the composite-signal value from the point coder and provide the composite signal to a communication channel; and a receiver to acquire the received composite signal with noise from the communication channel and provide it to the synchronizer.

79. The system of claim 72, wherein:

the ensemble replicator replicates the first embedding-value set based on at least a portion of the received composite signal with noise.

80. The system of claim 72, wherein:
the ensemble replicator replicates the one or more of the embedding values from the first embedding-value set based on an externally provided specification of a first plurality of embedding values.

81. The system of claim 56, wherein:
the one or more selected host-signal components are processed.

82. The system of claim 56, wherein:
the co-processed group of one or more watermark-signal components is processed.

83. The system of claim 56, wherein:
the host signal is a digital signal.

84. The system of claim 56, wherein:
the host signal is an analog signal.

85. The system of claim 56, wherein:
the watermark signal is a digital signal.

86. The system of claim 56, wherein:
the watermark signal is an analog signal.

87. The system of claim 56, further comprising:
a watermark-signal value determiner that selects the co-processed group of one or more watermark-signal components based on a maximum allowable channel-induced distortion level.

88. The system of claim 56, further comprising:
a watermark-signal value determiner that selects the co-processed group of one or more watermark-signal components based on a total number of watermark-signal components in the watermark signal.

89. The system of claim 56, wherein the ensemble generator generates the plurality of embedding generators based on a maximum allowable watermark-induced distortion level.

90. The system of claim 56, wherein:
each embedding value of the first embedding value set is a uniquely mapped embedding value.

91. The system of claim 56, wherein:
the watermark signal is determined, at least in part, based on the host signal.

92. The system of claim 56, wherein:
the watermark signal is error-correction coded.

93. The system of claim 56, wherein:
the watermark signal is error-detection coded.

94. The system of claim 56, wherein:
the watermark signal is encrypted.

95. The system of claim 56, wherein:
the watermark signal is a transformed signal.

96. The system of claim 56, wherein:
for at least one embedding generator, the embedding values are evenly spaced.

97. The system of claim 56, wherein:
for at least one embedding generator, the embedding values are unevenly spaced.

98. The system of claim 56, wherein:
at least one plurality of embedding values is generated by an embedding generator selected from one or more of the group consisting of a list, description, table, formula, or function.

99. The system of claim 56, wherein:
for at least one host-signal component, the plurality of host-signal values are scalar values.

100. The system of claim 56, wherein:
for at least one host-signal component, the plurality of host-signal values are vector values.

101. The system of claim 56, wherein:
for at least one host-signal component, the plurality of host-signal values represent values of a type selected from one of the group consisting of amplitude, phase, frequency, linear predictive coding coefficient, or non-linear representation.

102. The system of claim 56, wherein:
for at least one watermark-signal component, the plurality of watermark-signal values are scalar values.

103. The system of claim 56, wherein:
for at least one watermark-signal component, the plurality of watermark-signal values are vector values.

104. The system of claim 56, wherein
the first embedding value is selected based on its proximity to the last one host-signal value.

105. The system of claim 56, further comprising:
a host signal analyzer and block selector that selects one or more host-signal components for embedding.

106. The system of claim 105, wherein:
at least one host-signal component of a co-processed group of host-signal components selected by the host signal analyzer and block selector is not quantized.

107. The system of claim 105, wherein:
the host signal analyzer and block selector selects one or more host-signal components based on their conveying important information.

108. The system of claim 105, wherein:
the host signal analyzer and block selector selects one or more host-signal components based on their not conveying important information.

109. A computer system that watermarks a host signal with a watermark signal, the watermark signal comprising watermark-signal components, each having one of a plurality of watermark-signal values, and the host signal comprising host-signal components, each having one of a plurality of host-signal values, the computer system comprising:
at least one embedding computer having an information embedder that embeds a watermark signal into a host signal, thereby creating a composite signal, the information embedder comprising:
an ensemble generator that generates a plurality of embedding generators, each corresponding to a single watermark-signal value of one watermark-signal component or a co-processed group of two or more watermark-signal components;
an embedding value generator that generates, by each of two or more of the plurality of embedding generators, a plurality of embedding values, the total of each plurality of embedding values comprising a first embedding-value set, wherein at least one embedding value generated by at least one embedding generator is not the same as any embedding value generated by at least one other embedding generator; and
a point coder that sets at least one host-signal value of one or more selected host-signal components to a first embedding value of a first embedding generator, thereby forming a composite-signal value, wherein the first embedding generator corresponds to a first watermark-signal value of the one watermark-signal component or the group of co-processed watermark-signal components, and, when each of the embedding generators is a quantizer, at least one quantization interval of at least one quantizer is not the same as any quantization interval of at least one other quantizer; and at least one extracting computer having an information extractor that extracts the first watermark-signal value from the first embedding value;

wherein, when each of the embedding generators is a dithered quantizer, each having quantization values that are uniformly spaced, and when the composite signal value is transmitted over a channel, then at least one quantization value of any of the dithered quantizers, plus at least one channel noise value capable of being induced by the channel, is not the same value as any of the quantization values of any of the dithered quantizers.

110. The computer system of claim 109, wherein the embedding value generator generates a first plurality of embedding values based on a first predetermined relationship between each of the two or more embedding values generated by at least one of the plurality of embedding generators.

111. The computer system of claim 109, wherein the embedding value generator generates a first plurality of embedding values based on a second predetermined relationship between a second embedding value generated by one embedding generator and a third embedding value generated by another embedding generator of the plurality of embedding generators.

112. The computer system of claim 109, wherein the second predetermined relationship is a dithered relationship.

113. The computer system of claim 109, wherein the embedding value generator generates a first plurality of embedding values based on a first predetermined list including at least one of the plurality of embedding values generated by at least one of the plurality of embedding generators.

114. The computer system of claim 109, wherein the information extractor comprises:

a synchronizer that acquires a received composite signal with noise that includes the received composite signal with noise value;

an ensemble replicator that replicates one or more embedding values from the first embedding-value set to form a second embedding-value set, at least one embedding value of the second embedding-value set having the same correspondence to a single watermark-signal value as have the one embedding values of the first embedding-value set from which the at least one embedding value of the second embedding value set is replicated;

a point decoder that selects a second embedding value of the second embedding-value set based on its proximity to the received composite signal with noise value, and that sets the reconstructed watermark-signal value to a one of the plurality of watermark-signal values to which the second embedding value corresponds.

115. The computer system of claim 114, wherein:

the second embedding value is an embedding value that is the closest of all embedding values of the second embedding-value set in distance to the received composite signal with noise value.

116. The computer system of claim 109, wherein:

the embedding computer and the extracting computer are the same computer.

117. The computer system of claim 109, further comprising:

a transmitter coupled to the embedding computer to receive a composite signal including the composite-signal value from the point coder and provide the composite signal to a communication channel; and a receiver coupled to the extracting computer to acquire the received composite signal with noise from the communication channel and provide it to the synchronizer.

118. The computer system of claim 109, wherein:

the first embedding value is selected based on its proximity to the at least one host-signal value.

119. A computer system that extracts a reconstructed watermark-signal value from a received composite signal with noise value that includes a composite-signal value and a channel noise value, wherein the reconstructed watermark-signal value represents a first watermark-signal value of a plurality of watermark-signal values of one watermark-signal component or a co-processed group of two or more watermark-signal components of a watermark signal, wherein the composite-signal value is formed by setting at least one host-signal value of one or more selected host-signal components of a host signal to a first embedding value of a first embedding generator that corresponds to the first watermark-signal value, and, when each of the embedding generators is a quantizer, at least one quantization interval of at least one quantizer is not the same as any quantization interval of at least one other quantizer;

and further wherein the first embedding value is one of a first embedding-value set of embedding values generated by a plurality of embedding generators, each of two or more of which generate a plurality of embedding values, wherein at least one embedding value generated by at least one embedding generator of the plurality of embedding generators is not the same as any embedding value generated by at least one other embedding generator of the plurality of embedding generators;

the computer system comprising:

(a) a synchronizer that acquires the received composite signal with noise value;

(b) an ensemble replicator that replicates one or more embedding values from the first embedding-value set to form a second embedding-value set, at least one embedding value of the second embedding-value set having the same correspondence to a single watermark-signal value as have embedding values of the first embedding-value set from which the at least one embedding value of the second embedding value set is replicated;

(c) a point decoder that selects a second embedding value of the second embedding-value set, wherein the second embedding value is selected based on its proximity to the received composite signal with noise value, and sets the reconstructed watermark-signal value to a one of the plurality of watermark-signal values to which the second embedding value corresponds;

wherein, when each of the embedding generators is a dithered quantizer, each having quantization values that are uniformly spaced, and when the composite signal value is transmitted over a channel, then at least one quantization value of any of the dithered quantizers, plus at least one channel noise value capable of being induced by the channel, is not the same value as any of the quantization values of any of the dithered quantizers.

120. The computer system of claim 119, wherein:

the first embedding value is selected based on its proximity to the at least one host-signal value.

121. Storage media that contains software that, when executed on an appropriate computing system, performs a method for watermarking a host signal with a watermark signal, the watermark signal comprising watermark-signal components, each having one of a plurality of watermark-signal values, and the host signal comprising host-signal components, each having one of a plurality of host-signal values, the method comprising:

(1) generating, by each of two or more of a plurality of embedding generators, each corresponding to a single watermark-signal value of one watermark-signal component or a co-processed group of two or more watermark-signal components, a plurality of embedding values, the total of each plurality of embedding values comprising a first embedding-value set, wherein at least one embedding value generated by at least one embedding generator is not the same as any embedding value generated by at least one other embedding generator; and (2) setting at least one host-signal value of one or more selected host-signal components to a first embedding value of a first embedding generator, thereby forming a composite-signal value, wherein the first embedding generator corresponds to a first watermark-signal value of the one watermark-signal component or the group of co-processed watermark-signal components, and, when each of the embedding generators is a quantizer, at least one quantization interval of at least one quantizer is not the same as any quantization interval of at least one other quantizer;

wherein, when each of the embedding generators is a dithered quantizer, each having quantization values that are uniformly spaced, and when the composite signal value is transmitted over a channel, then at least one quantization value of any of the dithered quantizers, plus at least one channel noise value capable of being induced by the channel, is not the same value as any of the quantization values of any of the dithered quantizers.

122. The method of claim 121, further comprising:

(3) extracting a reconstructed watermark-signal value from a received composite signal with noise value that includes the composite-signal value and a channel noise value, wherein the reconstructed watermark-signal value represents the first watermark-signal value.

123. The method of claim 122, wherein step 3 comprises:

(a) acquiring the received composite signal with noise value;

(b) replicating one or more embedding values from the first embedding-value set to form a second embedding-value set, at least one embedding value of the second embedding-value set having the same correspondence to a single watermark-signal value as have embedding values of the first embedding-value set from which the at least one embedding value of the second embedding value set is replicated;

(c) selecting a second embedding value of the second embedding-value set, wherein the second embedding value is an embedding value that is selected based on its proximity to the received composite signal with noise value; and (d) setting the reconstructed watermark-signal value to a one of the plurality of watermark-signal values to which the second embedding value corresponds.

124. The storage media of claim 121, wherein:

the first embedding value is selected based on its proximity to the at least one host-signal value.

125. A computer program product for use with an appropriate computing system, the computer program product comprising a computer usable medium having embodied therein computer readable program code method steps for watermarking a host signal with a watermark signal, the watermark signal comprising watermark-signal components, each having one of a plurality of watermark-signal values, and the host signal comprising host-signal components, each having one of a plurality of host-signal values, the computer readable program code method steps comprising:

(1) generating, by each of two or more of a plurality of embedding generators, each corresponding to a single watermark-signal value of one watermark-signal component or a co-processed group of two or more watermark-signal components, a plurality of embedding values, the total of each plurality of embedding values comprising a first embedding-value set, wherein at least one embedding value generated by at least one embedding generator is not the same as any embedding value generated by at least one other embedding generator; and (2) setting at least one host-signal value of one or more selected host-signal components to a first embedding value of a first embedding generator, thereby forming a composite-signal value, wherein the first embedding generator corresponds to a first watermark-signal value of the one watermark-signal component or the group of co-processed watermark-signal components, and, when each of the embedding generators is a quantizer, at least one quantization interval of at least one quantizer is not the same as any quantization interval of at least one other quantizer;

wherein, when each of the embedding generators is a dithered quantizer, each having quantization values that are uniformly spaced, and when the composite signal value is transmitted over a channel, then at least one quantization value of any of the dithered quantizers, plus at least one channel noise value capable of being induced by the channel, is not the same value as any of the quantization values of any of the dithered quantizers.

126. The computer program product of claim 125, wherein the computer readable program code method steps further comprise:

(3) extracting a reconstructed watermark-signal value from a received composite signal with noise value that includes the composite-signal value and a channel noise values wherein the reconstructed watermark-signal value represents the first watermark-signal value.

127. The computer program product of claim 126, wherein step 3 comprises:

(a) acquiring the received composite signal with noise value;

(b) replicating one or more embedding values from the first embedding-value set to form a second embedding-value set, at least one embedding value of the second embedding-value set having the same correspondence to a single watermark-signal value as have embedding values of the first embedding-value set from which the at least one embedding value of the second embedding value set is replicated;

(c) selecting a second embedding value of the second embedding-value set, wherein the second embedding value is an embedding value that is selected based on its proximity to the received composite signal with noise value; and (d) setting the reconstructed watermark-signal value to a one of the plurality of watermark-signal values to which the second embedding value corresponds.

128. The computer program product of claim 125, wherein:

the first embedding value is selected based on its proximity to the at least one host-signal value.

129. A method for watermarking a host signal with a watermark signal, the watermark signal comprising watermark-signal components, each having one of a plurality of watermark-signal values, and the host signal comprising host-signal components, each having one of a plurality of host-signal values, the method comprising:

(1) designating a plurality of embedding generators, each corresponding to a single watermark-signal value of one watermark-signal component or a co-processed group of two or more watermark-signal components, based at least in part on a maximum allowable channel-induced distortion level;

(2) generating, by each of two or more of the plurality of embedding generators, a plurality of embedding values, a total of each plurality of embedding values comprising a first embedding-value set, wherein at least one embedding value generated by at least one embedding generator is not the same as any embedding value generated by at least one other embedding generator; and (3) setting at least one host-signal value of one or more selected host-signal components to a first embedding value of a first embedding generator, thereby forming a composite-signal value, wherein the first embedding generator corresponds to a first watermark-signal value of the one watermark-signal component or the co-processed group of watermark-signal components, and, when each of the embedding generators is a quantizer, at least one quantization interval of at least one quantizer is not the same as any quantization interval of at least one other quantizer.

130. The method of claim 129, wherein:

step (1) is further based at least in part on a maximum allowable watermark-induced distortion level and a maximum allowable number of watermark-signal components per host-signal component.

131. The method of claim 130, wherein:

the maximum allowable number of watermark-signal components per host-signal component is greater than or equal to two.

132. A system that watermarks a host signal with a watermark signal, the watermark signal comprising watermark-signal components, each having one of a plurality of watermark-signal values, and the host signal comprising host-signal components, each having one of a plurality of host-signal values, the system comprising:

an ensemble generator that generates a plurality of embedding generators, each corresponding to a single watermark-signal value of one watermark-signal component or a co-processed group of two or more watermark-signal components, wherein the ensemble generator generates the plurality of embedding generators based at least in part on a maximum allowable channel-induced distortion level;

an embedding value generator that generates, by each of two or more of the plurality of embedding generators, a plurality of embedding values, the total of each plurality of embedding values comprising a first embedding-value set, wherein at least one embedding value generated by at least one embedding generator is not the same as any embedding value generated by at least one other embedding generator; and a point coder that sets at least one host-signal value of one or more selected host-signal components to a first embedding value of a first embedding generator, thereby forming a composite-signal value, wherein the first embedding generator corresponds to a first watermark-signal value of the one watermark-signal component or the group of co-processed watermark-signal components, and, when each of the embedding generators is quantizer, at least one quantization interval of at least one quantizer is not the same as any quantization interval of at least one other quantizer.

133. The system of claim 132, wherein:

the ensemble generator further generates the embedding generators based at least in part on a maximum allowable watermark-induced distortion level and a maximum allowable number of watermark-signal components per host-signal component.

the first embedding value is selected based on its proximity to the at least one host-signal value.

134. A method for watermarking a host signal with a watermark signal, the watermark signal comprising watermark-signal components, each having one of a plurality of watermark-signal values, and the host signal comprising host-signal components, each having one of a plurality of host-signal values, the method comprising:

(1) accessing a plurality of value-sets of two or more embedding values, the embedding values of each value-set corresponding to a single watermark-signal value of one watermark-signal component or a co-processed group of two or more watermark-signal components, wherein at least one embedding value of at least one value-set is not the same as any embedding value of at least one other value-set; and (2) setting at least one host-signal value of one or more selected host-signal components to a first embedding value of a first value-set, thereby forming a composite-signal value, wherein the first value-set corresponds to a first watermark-signal value of the one watermark-signal component or the co-processed group of watermark-signal components, and, when the embedding values are quantized values, at least one quantization interval of at least one value-set is not the same as any quantization interval of at least one other value-set;

wherein, when each embedding value of each value-set is a dithered quantization value, when the embedding values of each value-set are uniformly spaced with respect to each other, and when the composite signal value is transmitted over a channel, then at least one quantization value of any of the dithered quantizers, plus at least one channel noise value capable of being induced by the channel, is not the same value as any of the quantization values of any of the dithered quantizers.

135. The method of claim 134, further comprising:

(3) extracting a reconstructed watermark-signal value from a received composite signal with noise value that includes the composite-signal value and a channel noise value, wherein the reconstructed watermark-signal value represents the first watermark-signal value.

136. The method of claim 135, wherein:

the channel noise value is a value not including zero.

137. A method for extracting a reconstructed watermark-signal value from a received composite signal with noise value that includes a composite-signal value and a channel noise value, wherein (a) the reconstructed watermark-signal value represents a first watermark-signal value of a plurality of watermark-signal values of one watermark-signal component or a co-processed group of two or more watermark-signal components of a watermark signal, (b) the composite-signal value is formed by accessing a plurality of value-sets of two or more embedding values, the embedding values of each value-set corresponding to a single watermark-signal value, wherein at least one embedding value of at least one value-set is not the same as any embedding value of at least one other value-set, and setting at least one host-signal value of one or more selected host-signal components to a first embedding value of a first value-set, thereby forming the composite-signal value, (c) the first value-set corresponds to a first watermark-signal value of the one watermark-signal component or the co-processed group of watermark-signal components, (d) when the embedding values are quantized values, at least one quantization interval of at least one value-set is not the same as any quantization interval of at least one other value-set, and (e) when each of the embedding generators is a dithered quantizer, each having quantization values that are uniformly spaced, and when the composite signal value is transmitted over a channel, then at least one quantization value of any of the dithered quantizers, plus at least one channel noise value capable of being induced by the channel, is not the same value as any of the quantization values of any of the dithered quantizers, the method comprising:
  (1) acquiring the received composite signal with noise value;
  (2) replicating one or more embedding values from the first embedding-value set to form a second embedding-value set, at least one embedding value of the second embedding-value set having the same correspondence to a single watermark-signal value as have embedding values of the first embedding-value set from which the at least one embedding value of the second embedding value set is replicated;
  (3) selecting a second embedding value of the second embedding-value set, wherein the second embedding value is selected based on its proximity to the received composite signal with noise value; and
  (4) setting the reconstructed watermark-signal value to a one of the plurality of watermark-signal values to which the second embedding value corresponds.

138. A system for watermarking a host signal with a watermark signal, the watermark signal comprising watermark-signal components, each having one of a plurality of watermark-signal values, and the host signal comprising host-signal components, each having one of a plurality of host-signal values, wherein the system operates upon a plurality of value-sets of two or more embedding values, the embedding values of each value-set corresponding to a single watermark-signal value of one watermark-signal component or a co-processed group of two or more watermark-signal components, wherein at least one embedding value of at least one value-set is not the same as any embedding value of at least one other value-set the system comprising:
  a point coder that sets at least one host-signal value of one or more selected host-signal components to a first embedding value of a first value-set, thereby forming a composite-signal value, wherein the first value-set corresponds to a first watermark-signal value of the one watermark-signal component or the co-processed group of watermark-signal components, and, when the embedding values are quantized values, at least one quantization interval of at least one value-set is not the same as any quantization interval of at least one other value-set;

wherein, when each of the embedding generators is a dithered quantizer, each having quantization values that are uniformly spaced, and when the composite signal value is transmitted over a channel, then at least one quantization value of any of the dithered quantizers, plus at least one channel noise value capable of being induced by the channel, is not the same value as any of the quantization values of any of the dithered quantizers.

139. The system of claim 138, further comprising:
  an information extractor that extracts a reconstructed watermark-signal value from a received composite signal with noise value that includes the composite-signal value and a channel noise value, wherein the reconstructed watermark-signal value represents the first watermark-signal value.

140. The system of claim 139, wherein:
  the channel noise value is a value not including zero.

141. A system for extracting a reconstructed watermark-signal value from a received composite signal with noise value that includes a composite-signal value and a channel noise value, wherein (a) the reconstructed watermark-signal value represents a first watermark-signal value of a plurality of watermark-signal values of one watermark-signal component or a co-processed group of two or more watermark-signal components of a watermark signal, (b) the composite-signal value is formed by accessing a plurality of value-sets of two or more embedding values, the embedding values of each value-set corresponding to a single watermark-signal value, wherein at least one embedding value of at least one value-set is not the same as any embedding value of at least one other value-set, and setting at least one host-signal value of one or more selected host-signal components to a first embedding value of a first value-set, thereby forming the composite-signal value, (c) the first value-set corresponds to a first watermark-signal value of the one watermark-signal component or the co-processed group of watermark-signal components, (d) when the embedding values are quantized values, at least one quantization interval of at least one value-set is not the same as any quantization interval of at least one other value-set, and (e) when each of the embedding generators is a dithered quantizer, each having quantization values that are uniformly spaced, and when the composite signal value is transmitted over a channel, then at least one quantization value of any of the dithered quantizers, plus at least one channel noise value capable of being induced by the channel, is not the same value as any of the quantization values of any of the dithered quantizers,
  the system comprising an information extractor that extracts a reconstructed watermark-signal value from a received composite signal with noise value that includes the composite-signal value and a channel noise value, wherein the reconstructed watermark-signal value represents the first watermark-signal value.

142. The system of claim 141, wherein:
  the information extractor comprises
    (1) a synchronizer that acquires the received composite signal with noise value;
    (2) an ensemble replicator that replicates one or more embedding values from the first embedding-value set to form a second embedding-value set, at least one embedding value of the second embedding-value set having the same correspondence to a single watermark-signal value as have embedding values of the first embedding-value set from which the at least one embedding value of the second embedding value set is replicated; and (3) a point decoder that selects a second embedding value of the second embedding-value set, wherein the second embedding value is selected based on its proximity to the received composite signal with noise value, and that sets the reconstructed watermark-signal value to a one of the plurality of watermark-signal values to which the second embedding value corresponds.

143. A computer program product for use with an appropriate computing system, the computer program product comprising a computer usable medium having embodied therein computer readable program code method steps for extracting a reconstructed watermark-signal value from a received composite signal with noise value that includes a composite-signal value and a channel noise value, wherein (a) the reconstructed watermark-signal value represents a first watermark-signal value of a plurality of watermark-signal values of one watermark-signal component or a co-processed group of two or more watermark-signal components of a watermark signal, (b) the composite-signal value is formed by accessing a plurality of value-sets of two or more embedding values, the embedding values of each value-set corresponding to a single watermark-signal value, wherein at least one embedding value of at least one value-set is not the same as any embedding value of at least one other value-set, and setting at least one host-signal value of one or more selected host-signal components to a first embedding value of a first value-set, thereby forming the composite-signal value, (c) the first value-set corresponds to a first watermark-signal value of the one watermark-signal component or the co-processed group of watermark-signal components, (d) when the embedding values are quantized values, at least one quantization interval of at least one value-set is not the same as any quantization interval of at least one other value-set, and (e) when each of the embedding generators is a dithered quantizer, each having quantization values that are uniformly spaced, and when the composite signal value is transmitted over a channel, then at least one quantization value of any of the dithered quantizers, plus at least one channel noise value capable of being induced by the channel, is not the same value as any of the quantization values of any of the dithered quantizers, the computer readable program code method steps comprising extracting a reconstructed watermark-signal value from a received composite signal with noise value that includes the composite-signal value and a channel noise value, wherein the reconstructed watermark-signal value represents the first watermark-signal value.

144. The computer program product of claim 143, wherein:

the extracting comprises
(a) acquiring the received composite signal with noise value;
(b) replicating one or more embedding values from the first embedding-value set to form a second embedding-value set, at least one embedding value of the second embedding-value set having the same correspondence to a single watermark-signal value as have embedding values of the first embedding-value set from which the at least one embedding value of the second embedding value set is replicated; and
(c) selecting a second embedding value of the second embedding-value set, wherein the second embedding value is selected based on its proximity to the received composite signal with noise value, and that sets the reconstructed watermark-signal value to a one of the plurality of watermark-signal values to which the second embedding value corresponds.

* * * * *

UNITED STATES PATENT AND TRADEMARK OFFICE
CERTIFICATE OF CORRECTION

PATENT NO. : 6,314,192 B1
DATED : November 6, 2001
INVENTOR(S) : Brian Chen et al.

Page 1 of 1

It is certified that error appears in the above-identified patent and that said Letters Patent is hereby corrected as shown below:

<u>Column 1,</u>
Line 5, insert as first paragraph of text:

-- This invention was made with government support under Grant No. N00014-96-1-0930 awarded by the Navy and under Grant No. F49620-96-1-0072 awarded by the Air Force. The government has certain rights in the invention. --

Signed and Sealed this

Twenty-first Day of May, 2002

JAMES E. ROGAN
*Director of the United States Patent and Trademark Office*

*Attest:*

*Attesting Officer*